(12) United States Patent
Matsuo et al.

(10) Patent No.: US 12,060,475 B2
(45) Date of Patent: Aug. 13, 2024

(54) SULFUR-CONTAINING SILANE COMPOUND AND COMPOSITION THEREOF

(71) Applicant: ENEOS Corporation, Tokyo (JP)

(72) Inventors: Yusuke Matsuo, Tokyo (JP); Keisuke Chino, Tokyo (JP)

(73) Assignee: ENEOS Corporation, Tokyo (JP)

( * ) Notice: Subject to any disclaimer, the term of this patent is extended or adjusted under 35 U.S.C. 154(b) by 533 days.

(21) Appl. No.: 17/432,037

(22) PCT Filed: Feb. 25, 2020

(86) PCT No.: PCT/JP2020/007535
§ 371 (c)(1),
(2) Date: Aug. 18, 2021

(87) PCT Pub. No.: WO2020/175493
PCT Pub. Date: Sep. 3, 2020

(65) Prior Publication Data
US 2022/0325075 A1    Oct. 13, 2022

(30) Foreign Application Priority Data

Feb. 25, 2019 (JP) .................... 2019-032080

(51) Int. Cl.
| C08K 5/548 | (2006.01) |
| B60C 1/00 | (2006.01) |
| C07F 7/18 | (2006.01) |
| C08L 9/06 | (2006.01) |
| C09J 11/06 | (2006.01) |

(52) U.S. Cl.
CPC .............. C08K 5/548 (2013.01); B60C 1/00 (2013.01); C07F 7/1804 (2013.01); C08L 9/06 (2013.01); C09J 11/06 (2013.01)

(58) Field of Classification Search
CPC .. C08K 5/548; C07F 7/18; C09J 11/06; C08L 9/06; B60C 1/00
USPC ...................................................... 524/157
See application file for complete search history.

(56) References Cited

U.S. PATENT DOCUMENTS

| 5,514,827 A | 5/1996 | Petty |
| 5,534,599 A | 7/1996 | Sandstrom et al. |
| 6,350,797 B1 | 2/2002 | Weller |
| 2013/0245194 A1 | 9/2013 | Huang et al. |

FOREIGN PATENT DOCUMENTS

| EP | 3904481 A1 | 11/2021 |
| JP | H08-259736 A | 10/1996 |
| JP | H11-080209 A | 3/1999 |
| JP | H11-335381 A | 12/1999 |
| JP | 2001-261685 A | 9/2001 |
| JP | 2014-177432 A | 9/2014 |
| JP | 2014-177580 A | 9/2014 |
| JP | 2014177432 A * | 9/2014 |
| JP | 2016-060836 A | 4/2016 |
| WO | WO 2004/009695 A1 | 1/2004 |
| WO | WO 2017/188411 A1 | 11/2017 |

OTHER PUBLICATIONS

China National Intellectual Property Administration, Office Action in Chinese Patent Application No. 202080014303.2 (Aug. 24, 2023).
Dixon et al., "Ring Expansion of 5- to 6-member Zirconacycles by Carbenoid Insertion," *Tetrahedron*, 60(6): 1401-1416 (2004).
Pellissier et al., "Titanium Tetrachloride Mediated Addition of 1,8-Bis(trimethylsilyl)-2,6-octadiene to Aldehydes. A One-Step Control of Four Stereogenic Carbon Centers," *J. Org. Chem.* 59(7): 1709-1713 (1994).
European Patent Office, Extended European Search Report in European Patent Application No. 20763075.7 (Oct. 31, 2022).
Japan Patent Office, Notice of Reasons for Refusal in Japanese Patent Application No. 2019-032080 (Oct. 21, 2022).
Japan Patent Office, Decision of Refusal in Japanese Patent Application No. 2019-032080 (Apr. 4, 2023).
Japanese Patent Office, International Preliminary Report in Patentability in International Patent Application No. PCT/JP2020/007535 (Aug. 25, 2021).
Japanese Patent Office, International Search Report in International Patent Application No. PCT/JP2020/007535 (May 26, 2020).
Japan Patent Office, Reconsideration Report in Japanese Patent Application No. 2019-032080 (Oct. 3, 2023).
China National Intellectual Property Administration, Office Action in Chinese Patent Application No. 202080014303.2 (Oct. 24, 2022).

\* cited by examiner

*Primary Examiner* — Deve V Hall
(74) *Attorney, Agent, or Firm* — Leydig, Voit & Mayer, Ltd.

(57) ABSTRACT

Disclosed is a sulfur-containing silane compound for obtaining a cross-linked product which does not generate poor dispersion or adhesion between an organic polymer material and an inorganic material and exhibits excellent viscoelastic properties or adhesive properties, or a composition comprising the same. In particular, disclosed is a sulfur-containing silane compound represented by formula (1):

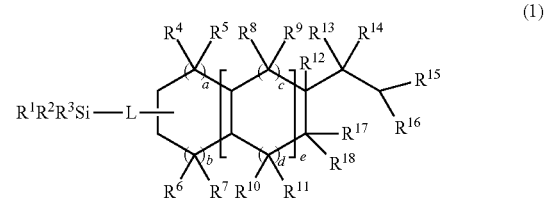

wherein a, b, c, d, e, L, and each R group is as defined herein.

20 Claims, 1 Drawing Sheet

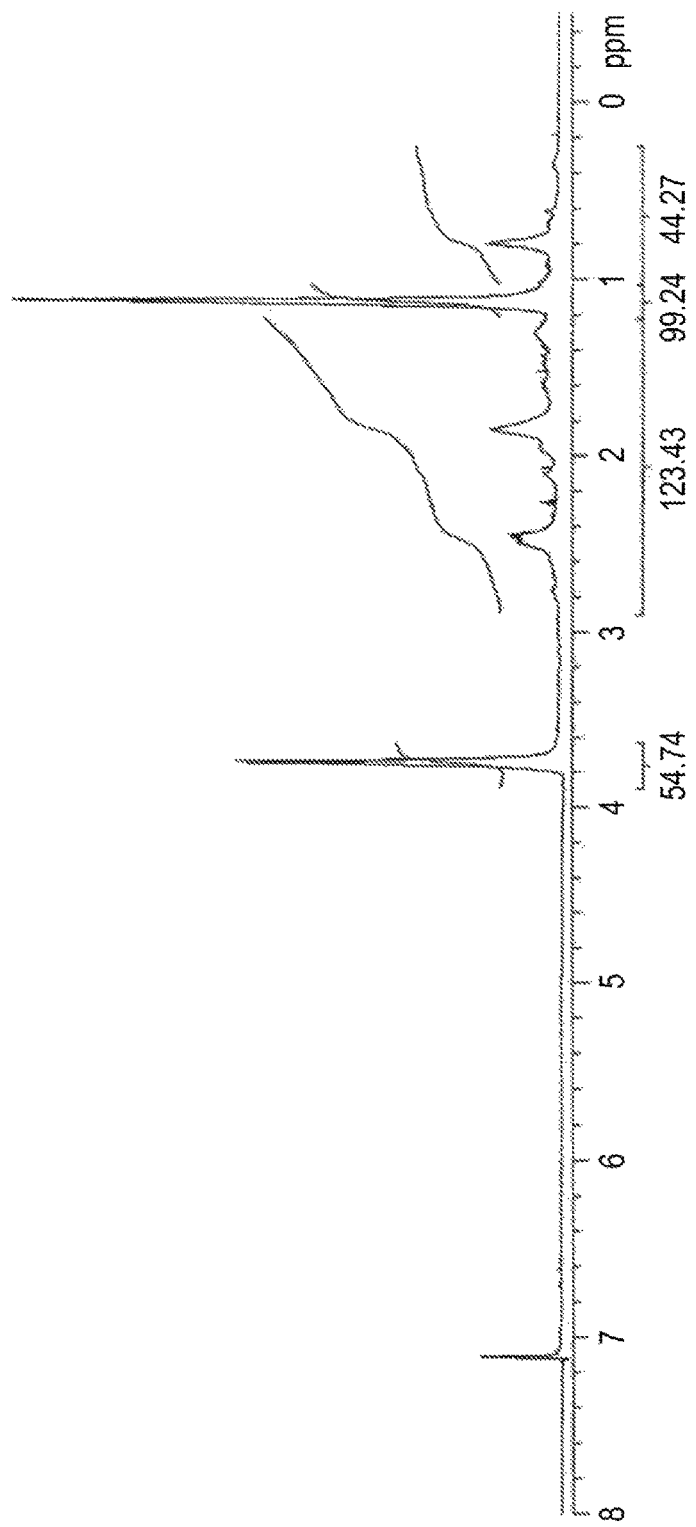

SULFUR-CONTAINING SILANE COMPOUND AND COMPOSITION THEREOF

BACKGROUND OF THE INVENTION

Field of the Invention

The present invention relates to a sulfur-containing silane compound and a composition comprising thereof.

Background Art

Conventionally, a silane compound having a reactive functional group and a hydrolyzable group has been used as a constituent of a silane coupling agent in a rubber composition in order to improve dispersibility of an organic polymer material such as rubber and an inorganic material such as silica or glass. In addition, such a silane compound has been used as an adhesion aid in a sealing agent or an adhesive in order to improve adhesion to an inorganic material such as silica.

Usually, such a silane compound has a substituent such as a mercapto group, a polysulfide group, an amino group or an epoxy group as a reactive functional group having high reactivity with an organic polymer material such as rubber, and has a substituent such as an alkoxysilyl group as a hydrolyzable group having high reactivity with an inorganic material such as silica. For example, Patent Document 1 discloses a rubber composition containing a polysulfide-based silane coupling agent. Patent document 2 discloses a silane compound having an amino group as a reactive functional group and a methoxy group as a hydrolyzable group.

Patent Documents 3 to 5 disclose a silyl group-containing cyclic sulfide compound and a rubber composition containing thereof.

PRIOR ART DOCUMENT

Patent Document

Patent Document 1: Japanese Patent Laid-Open Publication No. H8-259736
Patent Document 2: Japanese Patent Laid-Open Publication No. H11-335381
Patent Document 3: Japanese Patent Laid-Open Publication No. H11-80209
Patent Document 4: Japanese Patent Laid-Open Publication No. 2001-261685
Patent Document 5: WO2004/009695

SUMMARY OF THE INVENTION

Problem to be Solved by the Invention

However, since the reactive functional group of the silane compound described in Patent Documents 1 and 2 has high polarity, affinity with the organic polymer material is low, which tends to cause poor dispersion and mixing. On the other hand, when a conventional silane compound having a reactive functional group with low polarity is added in order to increase affinity with such organic polymer material, reactivity with the organic polymer material was low, and performance as a silane coupling agent or an adhesion aid was insufficient.

Also, although the silyl group-containing cyclic sulfide compounds described in Patent Documents 3 to 5 have reactivity with respect to organic polymer materials, they were not necessarily sufficient in terms of affinity with the organic polymer materials and dispersibility with inorganic materials.

With respect to the problem of improving affinity with organic polymer materials and dispersibility of organic polymer materials and inorganic materials of a silane coupling agent, the present inventors have intensively studied means for solving such problem. As a result, it has been found that blending a compound with an alicyclic hydrocarbon structure in which the silyl group is bonded by a side chain in an adequate length and a sulfide structure in a rubber composition, etc. promotes coupling reaction and improves dispersibility of the inorganic material such as silica, and as a result, it is possible to improve viscoelastic properties of a cross-linked product (rubber product) obtained from the rubber composition or the like. The present invention is based on this finding.

Accordingly, it is an object of the present invention to provide a sulfur-containing silane compound for obtaining a cross-linked product which does not generate poor dispersion or mixing between an organic polymer material and an inorganic material and exhibits excellent viscoelastic properties or adhesive properties, or a composition containing the silane compound.

Means for Solving the Problem

The present invention encompasses the following invention.

[1] A sulfur-containing silane compound represented by formula (1):

$$R^1R^2R^3Si\text{—}L\text{—}\underset{R^6\ R^7R^{10}\ R^{11}}{\overset{R^4\ R^5\ R^8\ R^9\ R^{13}\ R^{14}}{\underset{a}{\overset{}{\bigcirc}}\underset{b}{\overset{}{\bigcirc}}\underset{c}{\overset{R^{12}}{\bigcirc}}\underset{d}{\overset{}{\bigcirc}}\underset{e}{\overset{R^{17}\ R^{16}}{\bigcirc}}R^{15}}}R^{18}$$ (1)

wherein $R^1$, $R^2$, and $R^3$ each independently represents a hydrocarbon group optionally containing an oxygen atom or a nitrogen atom, or a hydrogen atom;
L represents a hydrocarbon group optionally containing at least one hetero atom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent hydrogen, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g is an integer from 1 to 5;
$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other via sulfur of 1 to 10 atoms to form a ring and $R^{14}$, $R^{15}$, and $R^{18}$ are hydrogen atoms, or $R^{14}$ and $R^{15}$ bond to each other via sulfur of 1 to 10 atoms to form a ring, and $R^{12}$, $R^{13}$, and $R^{18}$ are hydrogen atoms; or $R^{16}$ and $R^{17}$ may bond to each other to form a 4 to 9 membered alicyclic hydrocarbon, where $R^{14}$ and $R^{15}$ bond to each other via sulfur of 1 to 10 atoms to form a ring, and $R^{12}$, $R^{13}$, and $R^{18}$ are hydrogen atoms; or by formula (2):

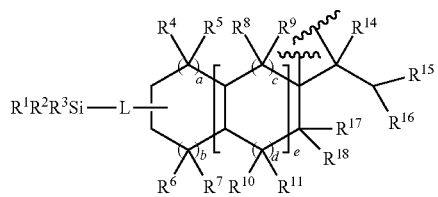

(2)

wherein A is a bivalent organic group represented by formula (1-1):

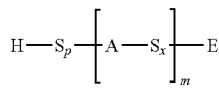

(1-1)

wherein $R^1$, $R^2$, and $R^3$ each independently represents a hydrocarbon group optionally containing an oxygen atom or a nitrogen atom, or a hydrogen atom;

L represents a hydrocarbon group optionally containing at least one hetero atom selected from the group consisting of nitrogen, oxygen, and sulfur;

a represents an integer of 0 or 1;

b represents an integer of 0 or 1;

c independently represents an integer of 0 or 1;

d independently represents an integer of 0 or 1;

e represents an integer of 0 to 5;

$R^4$, $R^5$, $R^6$, and $R^7$ represent hydrogen; or one of $R^4$ or $R^5$, and $R^6$ or $R^7$ may form a cross-linked structure represented by —$(CH_2)_f$—, and f represents an integer of 1 to 5;

$R^8$, $R^9$, $R^{10}$ and $R^{11}$ represent hydrogen; or one of $R^8$ or $R^9$ and $R^{10}$ or $R^{11}$ may form a cross-linked structure represented by —$(CH_2)_g$—, and g represents an integer of 1 to 5;

$R^{14}$, $R^{15}$, and $R^{18}$ are hydrogen atoms, $R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms; and the wavy line represents a binding site to the main chain in the sulfur-containing silane compound represented by formula (2), or formula (1-2):

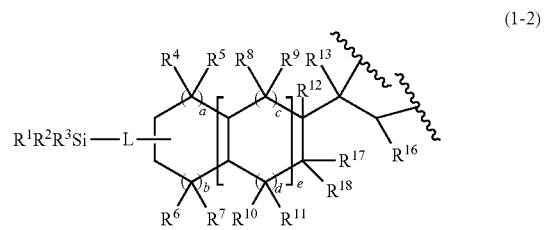

(1-2)

wherein $R^1$, $R^2$, and $R^3$ each independently represents a hydrocarbon group optionally containing an oxygen atom or a nitrogen atom, or a hydrogen atom;

L represents a hydrocarbon group optionally containing at least one hetero atom selected from the group consisting of nitrogen, oxygen, and sulfur;

a represents an integer of 0 or 1;

b represents an integer of 0 or 1;

c independently represents an integer of 0 or 1;

d independently represents an integer of 0 or 1;

e represents an integer of 0 to 5;

$R^4$, $R^5$, $R^6$, and $R^7$ represent hydrogen; or one of $R^4$ or $R^5$, and $R^6$ or $R^7$ may form a cross-linked structure represented by —$(CH_2)_f$—, and f represents an integer of 1 to 5;

$R^8$, $R^9$, $R^{10}$ and $R^{11}$ represent hydrogen; or one of $R^8$ or $R^9$ and $R^{10}$ or $R^{11}$ may form a cross-linked structure represented by —$(CH_2)_g$—, and g represents an integer of 1 to 5;

$R^{12}$, $R^{13}$, and $R^{18}$ are hydrogen atoms;

$R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms, and $R^{16}$ and $R^{17}$ may optionally bind to each other to form an alicyclic hydrocarbon of 4 to 9 members; and the wavy line represents a binding site to the main chain in the sulfur-containing silane compound represented by formula (2);

E represents a hydrogen atom or a substituent represented by formula (1-1-1):

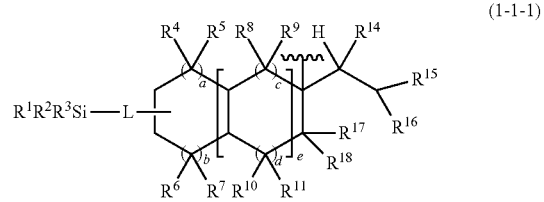

(1-1-1)

or formula (1-1-2):

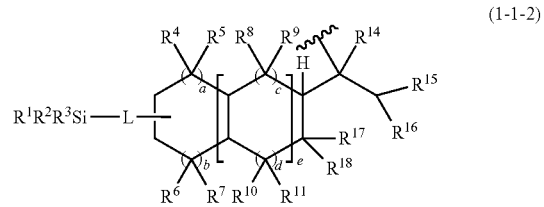

(1-1-2)

or
formula (1-2-1):

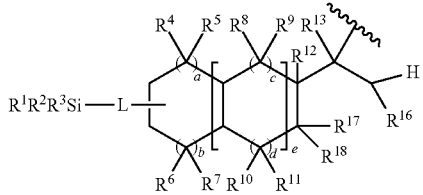

(1-2-1)

or
formula (1-2-2):

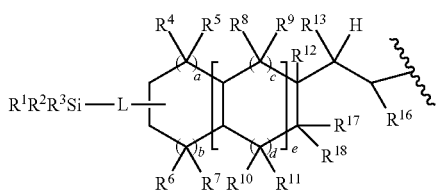

(1-2-2)

wherein $R^1$ to $R^{18}$, L, and a to e are according to formulae (1-1) and (1-2),
the wavy lines represent binding sites with $S_x$;
x each independently represents an integer from 1 to 30;
p represents an integer from 0 to 30;
m represents an integer from 2 to 30.

[2] The sulfur-containing silane compound according to [1], represented by formula (3):

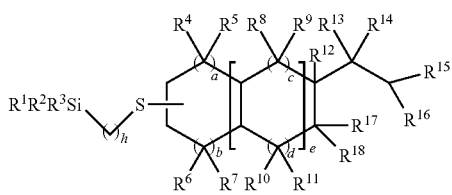

(3)

wherein $R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent hydrogen, or one of $R^4$ or $R^5$, and $R^6$ or $R^7$ may form a cross-linked structure represented by —$(CH_2)_f$—, and f represents an integer of 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g represents an integer of 1 to 5;
$R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms, where $R^{12}$ and $R^{13}$ bond to each other via sulfur of 1 to 10 atoms to form a ring, and $R^{14}$, $R^{15}$, and $R^{18}$ are hydrogen atoms, or $R^{14}$ and $R^{15}$ bond to each other via sulfur of 1 to 10 atoms to form a ring and $R^{12}$, $R^{13}$, and $R^{18}$ are hydrogen atoms; or
$R^{16}$ and $R^{17}$ may bond to each other to form a 4 to 9 membered alicyclic hydrocarbon, where $R^{14}$ and $R^{15}$ bond to each other via sulfur of 1 to 10 atoms to form a ring and $R^{12}$, $R^{13}$, and $R^{18}$ are hydrogen atoms.

[3] The sulfur-containing silane compound according to [1] or [2], represented by formula (4):

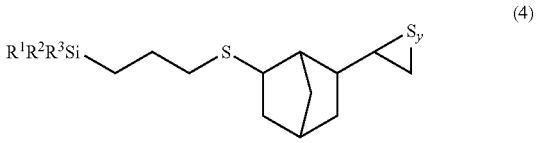

(4)

wherein $R^1$, $R^2$, and $R^3$ each independently represents a hydrocarbon group optionally containing an oxygen atom or a nitrogen atom, or a hydrogen atom; and
y is an integer of 1 to 10, or
formula (5):

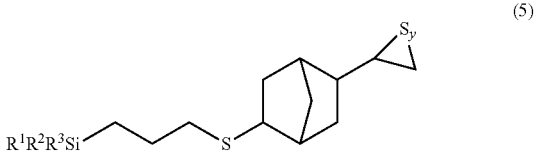

(5)

wherein $R^1$, $R^2$, and $R^3$ each independently represents a hydrocarbon group optionally containing an oxygen atom or a nitrogen atom, or a hydrogen atom; and
y is an integer of 1 to 10, or
formula (18):

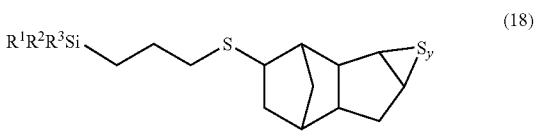

(18)

wherein $R^1$, $R^2$, and $R^3$ each independently represents a hydrocarbon group optionally containing an oxygen atom or a nitrogen atom, or a hydrogen atom; and
y is an integer of 1 to 10, or
formula (19):

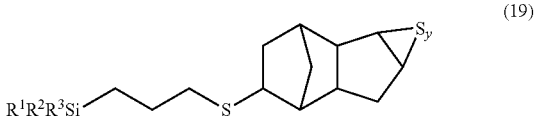

(19)

wherein $R^1$, $R^2$, and $R^3$ each independently represents a hydrocarbon group optionally containing an oxygen atom or a nitrogen atom, or a hydrogen atom; and
y is an integer of 1 to 10.

[4] The sulfur-containing silane compound according to [1], wherein A is a bivalent organic group represented by formula (3-1):

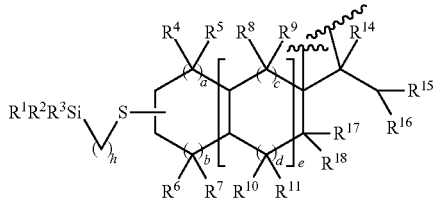

(3-1)

wherein
$R^1$, $R^2$, and $R^3$ each independently represents a hydrocarbon group optionally containing an oxygen atom or a nitrogen atom, or a hydrogen atom;

h represents an integer from 1 to 10;

a represents an integer of 0 or 1;

b represents an integer of 0 or 1;

c independently represents an integer of 0 or 1;

d independently represents an integer of 0 or 1;

e represents an integer of 0 to 5;

$R^4$, $R^5$, $R^6$, and $R^7$ represent hydrogen, or one of $R^4$ or $R^5$, and $R^6$ or $R^7$ may form a cross-linked structure represented by —$(CH_2)_f$—, and f represents an integer of 1 to 5;

$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g represents an integer of 1 to 5;

$R^{14}$, $R^{15}$, and $R^{18}$ are hydrogen atoms, $R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms; and the wavy line represents a binding site to the main chain in the sulfur-containing silane compound represented by formula (2), or formula (3-2):

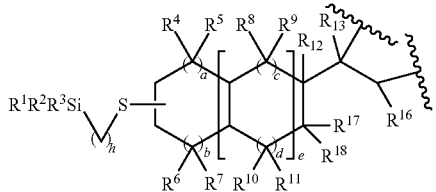

(3-2)

wherein $R^1$, $R^2$, and $R^3$ each independently represents a hydrocarbon group optionally containing an oxygen atom or a nitrogen atom, or a hydrogen atom;

h represents an integer from 1 to 10;

a represents an integer of 0 or 1;

b represents an integer of 0 or 1;

c independently represents an integer of 0 or 1;

d independently represents an integer of 0 or 1;

e represents an integer of 0 to 5;

$R^4$, $R^5$, $R^6$, and $R^7$ represent hydrogen, or one of $R^4$ or $R^5$, and $R^6$ or $R^7$ may form a cross-linked structure represented by —$(CH_2)_f$—, and f represents an integer of 1 to 5;

$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g represents an integer of 1 to 5;

$R^{12}$, $R^{13}$, and $R^{18}$ are hydrogen atoms;

$R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms, and $R^{16}$ and $R^{17}$ may optionally bind to each other to form an alicyclic hydrocarbon of 4 to 9 members;

the wavy line represents a binding site to the main chain in the sulfur-containing silane compound represented by formula (2).

[5] The sulfur-containing silane compound according to [1] or [4], wherein A is a bivalent organic group represented by formula (4-1):

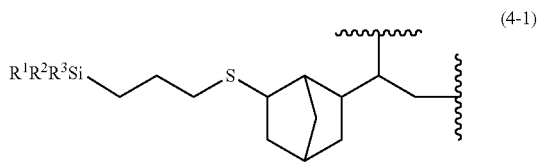

(4-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (5-1):

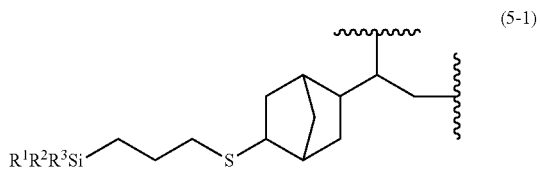

(5-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (18-1):

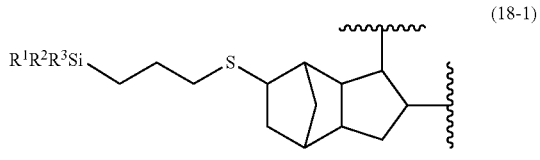

(18-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2);

or formula (19-1):

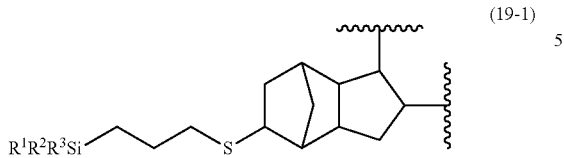
(19-1)

wherein $R^1$, $R^2$, and $R^3$ each independently represents a hydrocarbon group optionally containing an oxygen atom or a nitrogen atom, or a hydrogen atom; and
the wavy line represents a binding site to the main chain in the sulfur-containing silane compound represented by formula (2).

[6] The sulfur-containing silane compound according to any one of [1] to [5], wherein
$R^1R^2R^3Si$ group has a chemical structure of formula (6):

(6)

wherein
$R^{19}$ each independently represents an alkoxy group or an amino group substituted with one or more alkyl groups;
$R^{20}$ each independently represents hydrogen or an alkyl group;
$L^1$ each independently represents a hydrocarbon group optionally including at least one hetero atom selected from the group consisting of nitrogen, oxygen, and sulfur;
j is independently an integer of 0 or 1;
k is an integer of 1 to 3; and
an asterisk (*) indicates a region bonded to a moiety other than a silyl group of the sulfur-containing silane compound.

[7] The sulfur-containing silane compound according to any one of [1] to [6], wherein
$R^1R^2R^3Si$ group is a triethoxysilyl group.

[8] A composition comprising the sulfur-containing silane compound according to any one of [1] to [7] and a polymer that is capable of reacting with the sulfur-containing silane compound.

[9] The composition according to [8], wherein
the polymer is an elastomer having a glass transition point of 25° C. or lower and further comprises an inorganic material.

[10] The composition according to [9], wherein
the elastomer having a glass transition point of 25° C. or lower comprises at least one selected from the group consisting of natural rubber, butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, chloroprene rubber, butyl rubber, and halogenated isobutylene-p-methyl styrene rubber.

[11] The composition according to [9] or [10], further comprising a sulfur-containing silane compound other than the compound represented by said formula (1) or (2).

[12] The composition according to [11], wherein the sulfur-containing silane compound other than the compound represented by formula (1) or (2) above is a sulfur-containing silane compound represented by formula (7):

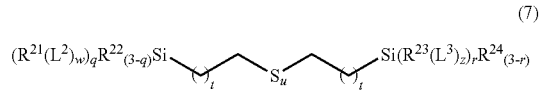
(7)

wherein
t and v are each independently an integer from 0 to 10;
u is an integer from 2 to 10;
q and r are each independently an integer from 1 to 3;
w and z are each independently an integer of 0 or 1;
$L^2$ and $L^3$ are each independently a hydrocarbon group optionally containing at least one hetero atom selected from the group consisting of nitrogen, oxygen, and sulfur;
$R^{21}$ and $R^{23}$ are each independently an alkoxy group or an amino group substituted with one or more alkyl groups; and
$R^{22}$ and $R^{24}$ are each independently hydrogen or an alkyl group.

[13] The composition according to any one of [9] to [12], wherein
the total content of the sulfur-containing silane compound in the composition is 0.1 to 30 parts by mass with respect to 100 parts by mass of the elastomer.

[14] The composition according to any one of [11] to [13], wherein
the proportion of the content of the sulfur-containing silane compound other than the compound represented by formula (1) or (2) in the composition with respect to the total content of the sulfur-containing silane compound in the composition is 0.1 to 0.9 on a mass basis.

[15] A method for producing the composition according to any one of [9] to [14], comprising the step of kneading the sulfur-containing silane compound, the elastomer, and the inorganic material.

[16] The method according to [15], further comprising the step of kneading a vulcanizing agent.

[17] A cross-linked product of the composition according to any one of [9] to [14].

[18] A method for producing a cross-linked product, comprising the step of extruding the composition according to any one of [9] to [14], the step of molding the extruded composition, and the step of cross-linking the molded composition.

[19] A tire comprising the cross-linked product according to [17].

[20] The composition according to [8], wherein
the polymer is a sealing polymer or an adhesive.

[21] The composition according to [20], wherein
the content of the sulfur-containing silane compound in the composition is 0.1 to 30 parts by mass with respect to 100 parts by mass of the composition.

[22] A surface treatment method for an inorganic material comprising the step of bringing the sulfur-containing silane compound according to any one of [1] to [7] into contact with the surface of the inorganic material.

Effect of the Invention

The present invention is advantageous in that it is possible to provide a sulfur-containing silane compound useful as a silane coupling agent, which does not cause poor dispersion or poor mixing of an organic polymer material such as rubber and an inorganic material. Using the sulfur-containing silane compound according to the present invention in a rubber composition is advantageous in that the viscoelastic properties of a crosslinked product obtained from the rubber composition can be improved. Further, the present invention is advantageous in that the rolling resistance suppression performance of a crosslinked product obtained from the rubber composition can be improved. Further, the present invention is advantageous in that the wet grip performance of a crosslinked product obtained from the rubber composition can be improved. Further, the present invention is advantageous in that the adhesive properties of a crosslinked product thus obtained can be improved.

BRIEF DESCRIPTION OF THE DRAWINGS

FIG. 1 shows a $^1$H-NMR chart of Sulfur-Containing Silane Compound 1 synthesized in Example 1 (1)-1.

DETAILED DESCRIPTION OF THE INVENTION

Mode for Carrying Out the Invention

1. Definitions

In the present specification, "parts", "%", etc., indicating formulations, are based on mass unless otherwise specified.

2. Sulfur-Containing Silane Compound (1) Sulfur-Containing Silane Compound

The sulfur-containing silane compound according to the present invention is represented by the following formula (1):

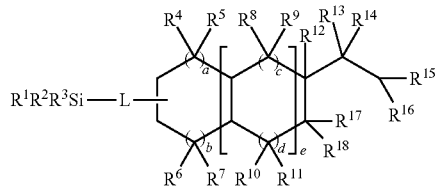

(1)

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one heteroatom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent hydrogen, or one of $R^4$ or $R^5$ and $R^6$ or $R^7$ may form a cross-linked structure represented by —(CH$_2$)$_f$—, and f is an integer from 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by —(CH$_2$)$_g$—, g is an integer from 1 to 5,
$R^{16}$ is a hydrogen atom, a methyl group or an alkyl group having 2 to 8 carbons and $R^{17}$ is a hydrogen atom, a methyl group or an alkyl group having 2 to 10 carbons, where $R^{12}$ and $R^{13}$ bond to each other via sulfur of 1 to 10 atoms to form a ring and $R^{14}$, $R^{15}$, and $R^{18}$ are hydrogen atoms, or $R^{14}$ and $R^{15}$ bond to each other via sulfur of 1 to 10 atoms to form a ring, and $R^{12}$, $R^{13}$, and $R^{18}$ are hydrogen atoms; or
$R^{16}$ and $R^{17}$ may bond to each other to form a 4 to 9 membered alicyclic hydrocarbon, where $R^{14}$ and $R^{15}$ bond to each other via sulfur of 1 to 10 atoms to form a ring and $R^{12}$, $R^{13}$, and $R^{18}$ are hydrogen atoms; or
formula (2): formula (2):

(2)

wherein A is a bivalent organic group represented by formula (1-1):

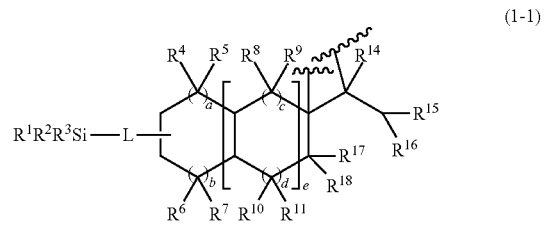

(1-1)

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one heteroatom selected from the group consisting of nitrogen, oxygen, and sulfur;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by —(CH$_2$)$_f$—; f represents an integer of 1 to 5;
$R^8$, $R^9$, $R^{10}$ and $R^{11}$ represent hydrogen; or one of $R^8$ or $R^9$ and $R^{10}$ or $R^{11}$ may form a cross-linked structure represented by —(CH$_2$)$_g$—; g represents an integer of 1 to 5;
$R^{14}$, $R^{15}$, and $R^{18}$ are hydrogen atoms; $R^{16}$ is a hydrogen atom, a methyl group, or an alkyl group having 2 to 8 carbon atoms; and $R^{17}$ is a hydrogen atom, a methyl group, or an alkyl group having 2 to 10 carbon atoms; and
the wavy line represents a binding site to the main chain in the sulfur-containing silane compound represented by formula (2),
or formula (1-2):

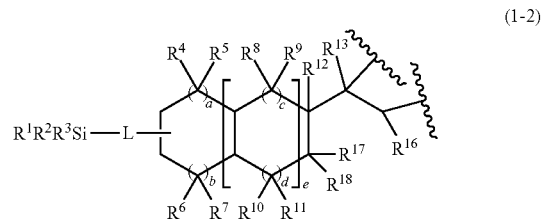

(1-2)

wherein $R^1$, $R^2$, and $R^3$ each independently represents a hydrocarbon group optionally containing an oxygen atom or a nitrogen atom, or a hydrogen atom;

L represents a hydrocarbon group optionally containing at least one heteroatom selected from the group consisting of nitrogen, oxygen, and sulfur;

a represents an integer of 0 or 1;

b represents an integer of 0 or 1;

c independently represents an integer of 0 or 1;

d independently represents an integer of 0 or 1;

e represents an integer of 0 to 5;

$R^4$, $R^5$, $R^6$, and $R^7$ represent hydrogen; or one of $R^4$ or $R^5$, and $R^6$ or $R^7$ may form a cross-linked structure represented by —$(CH_2)_f$—; f represents an integer of 1 to 5;

$R^8$, $R^9$, $R^{10}$ and $R^{11}$ represent hydrogen; or one of $R^8$ or $R^9$ and $R^{10}$ or $R^{11}$ may form a cross-linked structure represented by —$(CH_2)_g$—; g represents an integer of 1 to 5;

$R^{12}$, $R^{13}$, and $R^{18}$ are hydrogen atoms;

$R^{16}$ is a hydrogen atom, a methyl group, or an alkyl group having 2 to 8 carbon atoms; and $R^{17}$ is a hydrogen atom, a methyl group, or an alkyl group having 2 to 10 carbon atoms; and $R^{16}$ and $R^{17}$ may optionally bind to each other to form an alicyclic hydrocarbon of 4 to 9 members;

the wavy line represents a binding site to the main chain in the sulfur-containing silane compound represented by formula (2);

E represents a hydrogen atom or a substituent represented by formula (1-1-1):

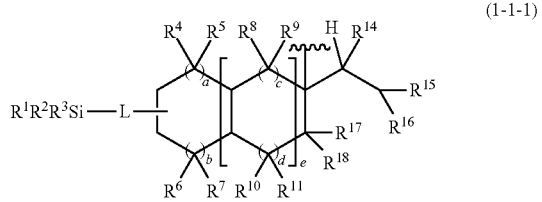

(1-1-1)

or
formula (1-1-2):

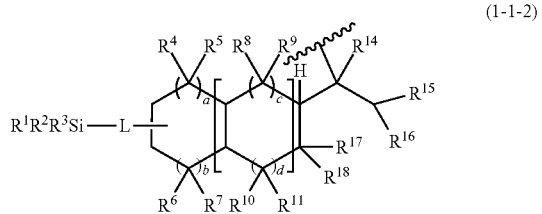

(1-1-2)

or
formula (1-2-1):

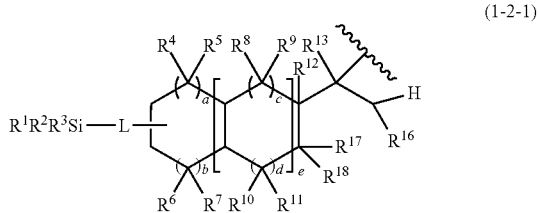

(1-2-1)

or
formula (1-2-2):

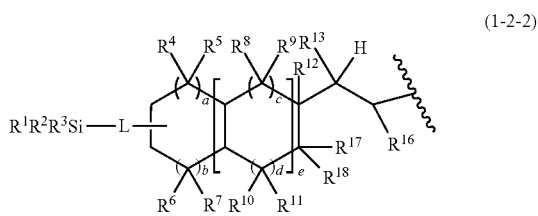

(1-2-2)

wherein $R^1$ to $R^{18}$, L, and a to e are according to formulae (1-1) and (1-2), the wavy lines represent binding sites with $S_x$;

x each independently represents an integer from 1 to 30;

p represents an integer from 0 to 30;

m represents an integer from 2 to 30.

In the above formula (1), a is an integer of 0 or 1, preferably 1.

Further, b is an integer of 0 or 1, preferably 1.

Further, c is each independently an integer of 0 or 1, preferably 1.

Further, d is each independently an integer of 0 or 1, preferably 1.

Further, e is an integer from 0 to 5, preferably an integer from 0 to 3, more preferably an integer from 0 to 2, further preferably an integer of 0 or 1.

Further, $R^4$, $R^5$, $R^6$, and $R^7$ represent hydrogen, or one of $R^4$ or $R^5$ and $R^6$ or $R^7$ may form a cross-linked structure represented by —$(CH_2)_f$—.

Further, f is an integer from 1 to 5, preferably an integer from 1 to 4, more preferably an integer from 1 to 3, further preferably 1.

Further, $R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—.

Further, g is an integer from 1 to 5, preferably an integer from 1 to 4, more preferably an integer from 1 to 3, further preferably 1.

Further, $R^{16}$ is a hydrogen atom, a methyl group or an alkyl group having 2 to 8 carbons, preferably a hydrogen atom, a methyl group or an alkyl group having 2 or 3 carbons, more preferably a hydrogen atom or a methyl group, further more preferably a hydrogen atom, and $R^{17}$ is a hydrogen atom, a methyl group or an alkyl group having 2 to 10 carbons, preferably a hydrogen atom, a methyl group or an alkyl group having 2 or 5 carbons, more preferably a hydrogen atom or a methyl group, further more preferably a hydrogen atom, where $R^{12}$ and $R^{13}$ bond to each other via sulfur of 1 to 10 atoms, preferably sulfur of 2 to 8 atoms, more preferably sulfur of 2 to 6 atoms, further preferably sulfur of 3 to 5 atoms, to form a ring and $R^{14}$, $R^{15}$, and $R^{18}$ are hydrogen atoms, or $R^{14}$ and $R^{15}$ bond to each other via sulfur of 1 to 10 atoms, preferably sulfur of 2 to 8 atoms, more preferably sulfur of 2 to 6 atoms, further preferably sulfur of 3 to 5 atoms, to form a ring and $R^{12}$, $R^{13}$, and $R^{18}$ are hydrogen atoms; or $R^{16}$ and $R^{17}$ may bond to each other to form a 4 to 9 membered alicyclic hydrocarbon, preferably a 4 to 7 membered alicyclic hydrocarbon, more preferably a 5 or 6 membered alicyclic hydrocarbon, further preferably a 5 membered alicyclic hydrocarbon, where $R^{14}$ and $R^{15}$ bond to each other via sulfur of 1 to 10 atoms, preferably sulfur of 2 to 8 atoms, more preferably sulfur of 2 to 6 atoms, further preferably sulfur of 3 to 5 atoms, to form a ring and $R^{12}$, $R^{13}$, and $R^{18}$ are hydrogen atoms, a methyl group or an alkyl group having 2 to 10 carbons.

In formula (1) above, $R^1$, $R^2$ and $R^3$ each independently represents a hydrocarbon group optionally containing an oxygen atom or a nitrogen atom, or a hydrogen atom. Examples include an alkyl group, an aralkyl group or an aryl group, and the like. Examples of the hydrocarbon group include an alkyl group, an aralkyl group or an aryl group, and the like.

Examples of the alkyl group include a methyl group, ethyl group, propyl group, butyl group, isopropyl group, tert-butyl group, 2-ethylhexyl group, cyclopentyl group, and cyclohexyl group, and the number of carbons in the alkyl group is preferably 1 to 60, more preferably 1 to 30, and a methyl group or an ethyl group is particularly preferred.

Examples of the aralkyl group include a benzyl group, phenethyl group, naphthylmethyl group, and biphenylmethyl group. The number of carbons in the aralkyl group is preferably from 7 to 60, more preferably from 7 to 20, and further preferably from 7 to 14.

Examples of the aryl group include a phenyl group, biphenyl group, naphthyl group, tolyl group, xylyl group, and the like. The number of carbons in the aryl group is preferably from 6 to 60, more preferably from 6 to 24, and further preferably from 6 to 12.

The hydrocarbon group containing an oxygen atom or a nitrogen atom is a group having a structure in which a carbon atom in the hydrocarbon group is replaced with an oxygen atom or a nitrogen atom.

In a further preferred embodiment of the invention, the hydrocarbon group optionally containing an oxygen atom or a nitrogen atom in $R^1$, $R^2$ and $R^3$ is an alkoxy group, an amino group substituted with one or more alkyl groups, or an alkyl group. More preferably, an alkoxy group having 1 to 30 carbons, further preferably an alkoxy group having 1 to 20 carbons, more preferably an amino group substituted with one or more alkyl groups having 1 to 30 carbons, further preferably an amino group substituted with one or more alkyl groups having 1 to 20 carbons, or more preferably an alkyl group having 1 to 30 carbons, further preferably an alkyl group having 1 to 20 carbons. Examples of the alkoxy group include a methoxy group, ethoxy group, propoxy group, isopropoxy group, butoxy group and isobutoxy group, and a methoxy group or an ethoxy group is particularly preferable. Examples of the amino group substituted with one or more alkyl groups include an N-methylamino group, N,N-dimethylamino group, N-ethylamino group, N,N-diethylamino group, and N-isopropylamino group, and an N-methylamino group or an N-ethylamino group is particularly preferable. Examples of the alkyl group include a methyl group, ethyl group, propyl group, isopropyl group, butyl group, isobutyl group, tert-butyl group, pentyl group, cyclopentyl group, hexyl group, and a cyclohexyl group, among which a methyl group and an ethyl group are preferable.

In formula (1) above, L is a hydrocarbon group which may contain at least one hetero atom selected from the group consisting of nitrogen, oxygen and sulfur, and preferably a hydrocarbon group having 1 to 30 carbons which may contain at least one hetero atom selected from the group consisting of nitrogen, oxygen and sulfur, more preferably a hydrocarbon group having 1 to 20 carbons which may contain at least one hetero atom selected from the group consisting of nitrogen, oxygen and sulfur, and further preferably a hydrocarbon group having 1 to 10 carbon atoms which may contain at least one hetero atom selected from the group consisting of nitrogen, oxygen and sulfur. Among them, L is particularly preferably a hydrocarbon group containing sulfur. The length of the straight chain portion connecting the silyl group and the alicyclic hydrocarbon portion in such hydrocarbon group is preferably from 3 to 8, more preferably from 4 to 7, and even more preferably from 4 to 6 as a total sum of number of atoms of carbon, nitrogen, oxygen, or sulfur.

In formula (2), A is a divalent organic group represented by formula (1-1) or formula (1-2).

x is each independently an integer of 1 to 30, preferably 1 to 15, more preferably 1 to 8, further preferably 1 to 5, and further more preferably 2 to 5.

p is an integer of 0 to 30.

m is an integer of 2 to 30, preferably 2 to 20, more preferably 2 to 15, and further preferably 2 to 10.

In the chemical structure represented by formula (1-1) above, the wavy line represents a binding site to the main chain in the sulfur-containing silane compound represented by formula (2). In addition, a to g, L, $R^1$ to $R^{11}$ and $R^{14}$ to $R^{18}$ are as described in formula (1) above.

In the chemical structure represented by formula (1-2) above, the wavy line represents a binding site to the main chain in the sulfur-containing silane compound represented by formula (2). In addition, a to g, L, $R^1$ to $R^{13}$ and $R^{16}$ to $R^{18}$ are as described in formula (1) above.

Although the present invention is not limited to a specific theory, it is considered that by adjusting the length of the straight chain portion of the side chain L between the silyl group and the alicyclic hydrocarbon structure in the sulfur-containing silane compound represented by formula (1), the polarity of the entire sulfur-containing silane compound can be lowered to improve the affinity with rubber, an adequate degree of freedom can be given to the steric structure of the sulfur-containing silane compound in the rubber molecule to promote a coupling reaction between silica and rubber mediated by the sulfur-containing silane compound, whereby viscoelastic properties can be improved. In the case of the sulfur-containing silane compound represented by formula (2), the same review as those for the sulfur-containing silane compound represented by formula (1) applies since the polysulfide structure is cleaved in the reaction for forming the co-bridge with the rubber.

According to one preferred embodiment of the present invention, the compound represented by formula (1) of the present invention is a compound represented by formula (3):

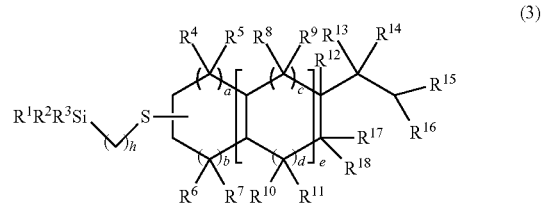

(3)

wherein
R¹, R², and R³ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is independently an integer of 0 or 1;
d is independently an integer of 0 or 1;
e is an integer from 0 to 5;
R⁴, R⁵, R⁶, and R⁷ represent hydrogen, or one of R⁴ or R⁵ and R⁶ or R⁷ may form a cross-linked structure represented by —(CH₂)_f—, and f is an integer from 1 to 5;
R⁸, R⁹, R¹⁰ and R¹¹ represent hydrogen atom, or one of R⁸ or R⁹ and R¹⁰ or R¹¹ may form a cross-linked structure represented by —(CH₂)_g—, g is an integer from 1 to 5, and
R¹⁶ is a hydrogen atom, a methyl group, or an alkyl group having 2 to 8 carbon atoms; and R¹⁷ is a hydrogen atom, a methyl group, or an alkyl group having 2 to 10 carbon atoms; where R¹² and R¹³ bond to each other via sulfur of 1 to 10 atoms to form a ring and R¹⁴, R¹⁵, and R¹⁸ are hydrogen atoms, or R¹⁴ and R¹⁵ bond to each other via sulfur of 1 to 10 atoms to form a ring and R¹², R¹³, and R¹⁸ are hydrogen atoms; or
R¹⁶ and R¹⁷ may bond to each other to form a 4 to 9 membered alicyclic hydrocarbon, where R¹⁴ and R¹⁵ bond to each other via sulfur of 1 to 10 atoms to form a ring and R¹², R¹³, and R¹⁸ are hydrogen atoms.

In the compound represented by formula (3), h is an integer of 1 to 10, preferably 1 to 8, more preferably 2 to 7, further preferably 3 to 6, further more preferably 3 to 5, and particularly preferably 3. Further, a-g and R¹ to R¹⁸ are as described in formula (1) above.

According to one preferred embodiment of the present invention, the compound according to (1) is a compound represented by formula (4):

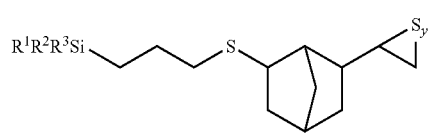

(4)

wherein R¹, R², and R³ each independently represent a hydrocarbon group optionally containing an oxygen atom or a nitrogen atom, or a hydrogen atom; and
y is an integer of 1 to 10, or
formula (5):

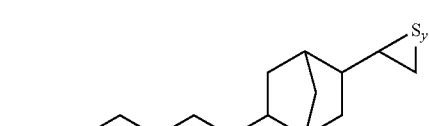

(5)

wherein R¹, R², and R³ each independently represents a hydrocarbon group optionally containing an oxygen atom or a nitrogen atom, or a hydrogen atom; and
y is an integer of 1 to 10, or
formula (18):

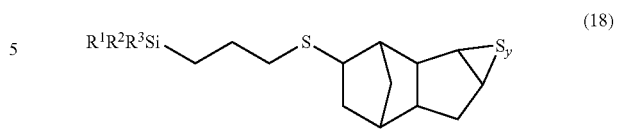

(18)

wherein R¹, R², and R³ each independently represents a hydrocarbon group optionally containing an oxygen atom or a nitrogen atom, or a hydrogen atom; and
y is an integer of 1 to 10, or
formula (19):

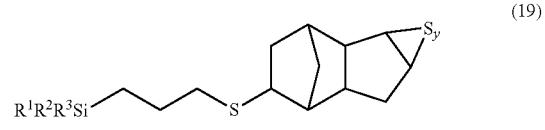

(19)

wherein R¹, R², and R³ each independently represents a hydrocarbon group optionally containing an oxygen atom or a nitrogen atom, or a hydrogen atom; and
y is an integer of 1 to 10.

In the compounds represented by formula (4), (5), (18) or (19), y is an integer of 1 to 10, preferably an integer of 2 to 8, more preferably an integer of 2 to 6, and further preferably an integer of 3 to 5. R¹ to R³ are as described in formula (1) above.

According to another preferred embodiment of the present invention, the compound according to formula (1) is a compound represented by formulae (8) to (17) and (20) to (23):

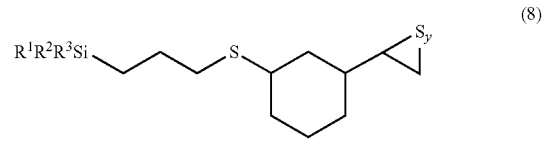

(8)

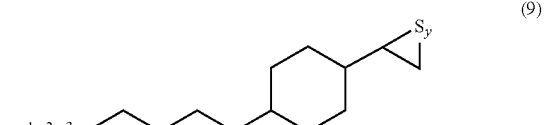

(9)

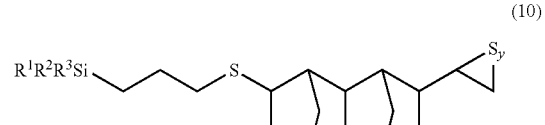

(10)

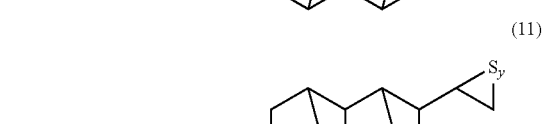

(11)

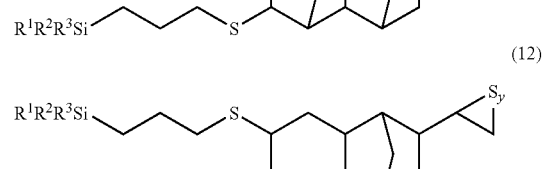

(12)

-continued

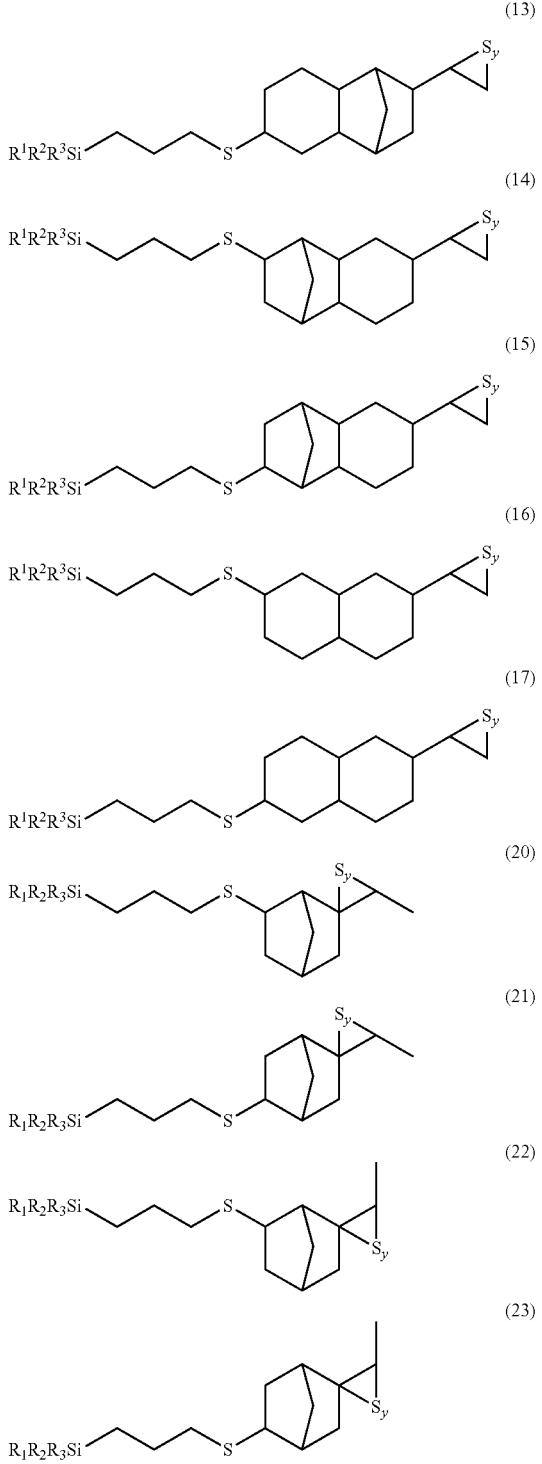

wherein R¹, R², and R³ each independently represents a hydrocarbon group optionally containing an oxygen atom or a nitrogen atom, or a hydrogen atom; and
y is an integer of 1 to 10.

In the compounds represented by formulae (8) to (17) and (20) to (23), y is as described above in formulae (4), (5), (18) and (19). In addition, R¹ to R³ are as described above in formula (1).

According to one preferred embodiment of the present invention, the compound according to (2) is a compound in which A in formula (2) is a bivalent organic group represented by formula (3-1):

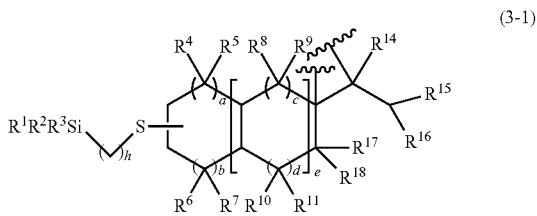

wherein
R¹, R², and R³ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by —$(CH_2)_f$—; f represents an integer of 1 to 5;
$R^8$, $R^9$, $R^{10}$ and $R^{11}$ represent hydrogen; or one of $R^8$ or $R^9$ and $R^{10}$ or $R^{11}$ may form a cross-linked structure represented by —$(CH_2)_g$—; g represents an integer of 1 to 5;
$R^{14}$, $R^{15}$, and $R^{18}$ are hydrogen atoms; $R^{16}$ is a hydrogen atom, a methyl group, or an alkyl group having 2 to 8 carbon atoms; and $R^{17}$ is a hydrogen atom, a methyl group, or an alkyl group having 2 to 10 carbon atoms; and
the wavy line represents a binding site to the main chain in the sulfur-containing silane compound represented by formula (2),
or formula (3-2):

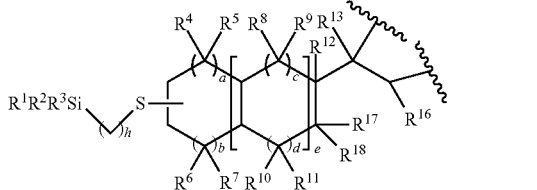

wherein R¹, R², and R³ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by —$(CH_2)_f$—; f represents an integer of 1 to 5;

$R^8$, $R^9$, $R^{10}$ and $R^{11}$ represent hydrogen; or one of $R^8$ or $R^9$ and $R^{10}$ or $R^{11}$ may form a cross-linked structure represented by —$(CH_2)_g$—; g represents an integer of 1 to 5;

$R^{12}$, $R^{13}$, and $R^{18}$ are hydrogen atoms;

$R^{16}$ is a hydrogen atom, a methyl group, or an alkyl group having 2 to 8 carbon atoms; and $R^{17}$ is a hydrogen atom, a methyl group, or an alkyl group having 2 to 10 carbon atoms; and $R^{16}$ and $R^{17}$ may optionally bind to each other to form an alicyclic hydrocarbon of 4 to 9 members;

the wavy line represents a binding site to the main chain in the sulfur-containing silane compound represented by formula (2).

In the chemical structure represented by formula (3-1) above, the wavy line represents a binding site to the main chain in the sulfur-containing silane compound represented by formula (2). In addition, a to g, $R^1$ to $R^{11}$, and $R^{14}$ to $R^{18}$ are as described in formula (1) above. In addition, h is as described in formula (3) above.

In the chemical structure represented by formula (3-2) above, the wavy line represents a binding site to the main chain in the sulfur-containing silane compound represented by formula (2). In addition, a to g, $R^1$ to $R^{13}$ and $R^{16}$ to $R^{18}$ are as described in formula (1) above. In addition, h is as described in formula (3) above.

According to a more preferred embodiment of the present invention, the compound according to (2) is a compound in which A is a bivalent organic group represented by formula (4-1):

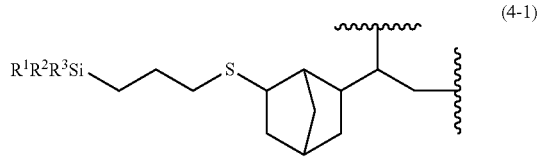

(4-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (5-1):

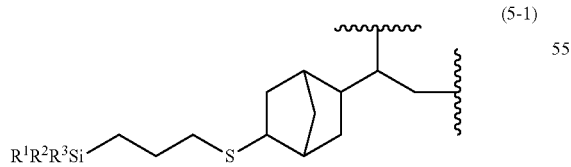

(5-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (18):

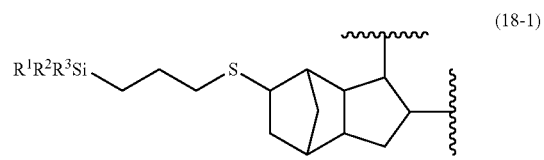

(18-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (19-1):

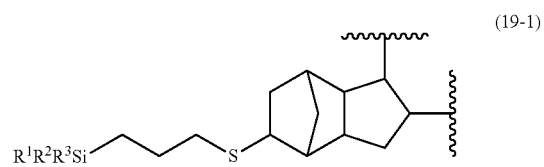

(19-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2).

In the chemical structure represented by the above formula (4-1), formula (5-1), formula (18-1) or formula (19-1), the wavy line represents a binding site with the main chain in the sulfur-containing silane compound represented by formula (2). $R^1$ to $R^3$ are as described in the above formula (1).

According to another further preferred embodiment of the present invention, the compound of formula (2) is a compound in which A in formula (2) above is a bivalent organic group represented by formulae (8-1) to (17-1) and (20-1) to (23-1):

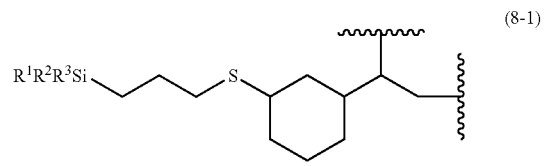

(8-1)

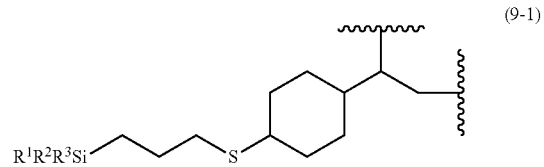

(9-1)

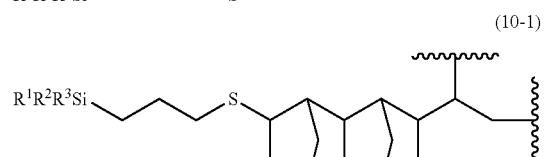

(10-1)

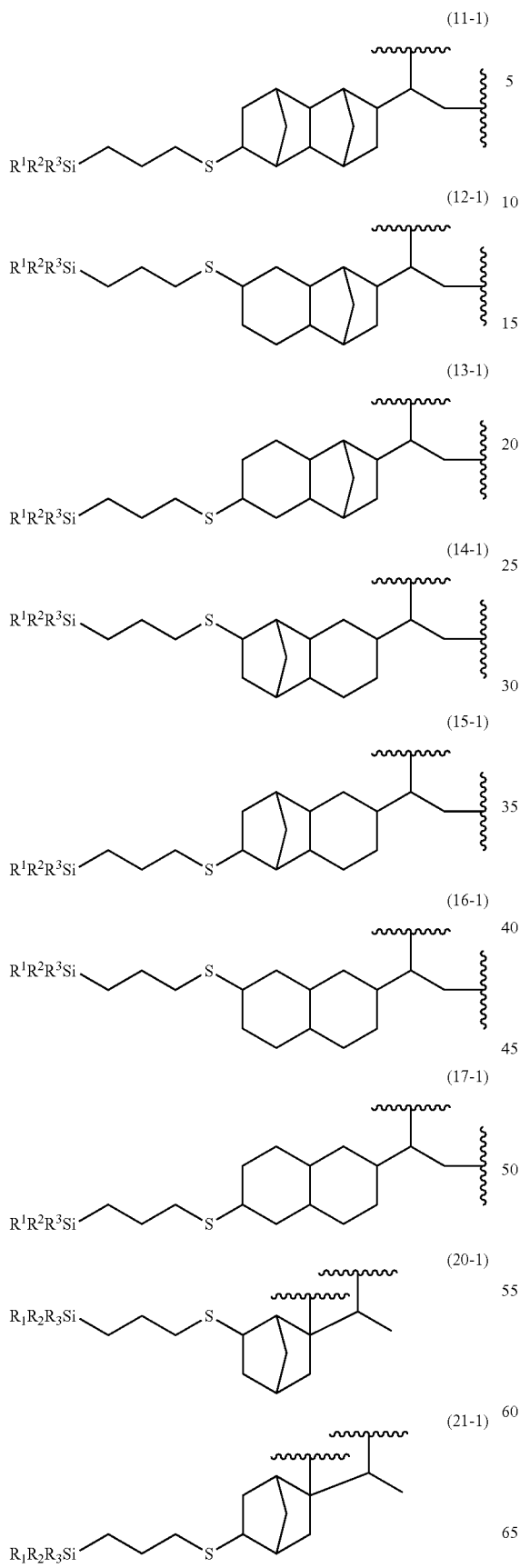

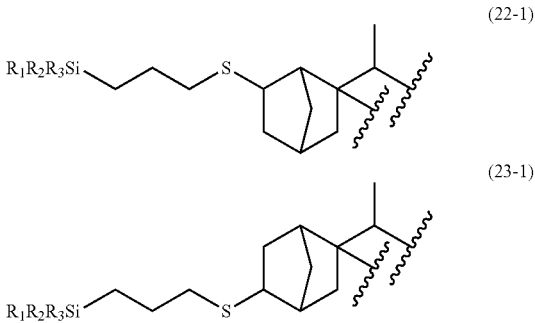

wherein R¹, R², and R³ each independently represents a hydrocarbon group optionally containing an oxygen atom or a nitrogen atom, or a hydrogen atom.

In the chemical structures represented by formulae (8-1) to (17-1) and (20-1) to (23-1), the wavy lines represent a binding site with the main chain in the sulfur-containing silane compound represented by formula (2). $R^1$ to $R^3$ are as described in the above formula (1).

A further preferable embodiment of the present invention includes a sulfur-containing silane compound having the chemical structure in which $R^1R^2R^3Si$ group in the above-mentioned formulae (1), (1-1), (1-2), (3), (3-1), (3-2), (4), (4-1), (5), (5-1), (8) to (23) and (8-1) to (23-1) represents formula (6):

(6)

wherein $R^{19}$ each independently represents an alkoxy group or an amino group substituted with one or more alkyl groups;

$R^{20}$ each independently represents hydrogen or an alkyl group;

$L^1$ each independently represents a hydrocarbon group optionally including at least one hetero atom selected from the group consisting of nitrogen, oxygen, and sulfur;

j is each independently an integer of 0 or 1;

k is an integer of 1 to 3; and an asterisk (*) indicates a region bonded to a moiety other than a silyl group of the sulfur-containing silane compound.

In formula (6) above, $R^{19}$ is each independently an alkoxy group or an amino group substituted with one or more alkyl groups. In one preferred embodiment, $R^{19}$ is each independently a hydrolyzable group, and is an alkoxy group, more preferably an alkoxy group having 1 to 30 carbons, further preferably an alkoxy group having 1 to 20 carbons, or an amino group substituted with one or more alkyl groups, more preferably an amino group substituted with one or more alkyl groups having 1 to 30 carbons, further preferably an amino group substituted with one or more alkyl groups having 1 to 20 carbons. Specifically, examples of the alkoxy group include a methoxy group, ethoxy group, propoxy group, isopropoxy group, butoxy group, and isobutoxy group, which among a methoxy group or an ethoxy group is preferable. Examples of the amino group substituted with one or more alkyl groups include an N-methylamino group, N,N-dimethylamino group, N-ethylamino group, N,N-diethylamino group, and N-isopropylamino group, which among an N-methylamino group or an N-ethylamino group is preferable. Note that, the alkoxy group and the amino group may be bonded with silicon (Si) via a connecting group comprising a hydrocarbon group optionally containing at least one hetero atom selected from the group consisting of nitrogen, oxygen, and sulfur.

$R^{20}$ each independently represents hydrogen or an alkyl group, more preferably an alkyl group having 1 to 30 carbons, and further preferably an alkyl group having 1 to 20 carbons, and specific examples thereof include a methyl group, ethyl group, propyl group, isopropyl group, butyl group, isobutyl group, tert-butyl group, pentyl group, cyclopentyl group, hexyl group and cyclohexyl group, among which a methyl group and an ethyl group are preferable.

In the above formula (6), $L^1$ is each independently a hydrocarbon group optionally containing at least one hetero atom selected from the group consisting of nitrogen, oxygen and sulfur, preferably a hydrocarbon group having 1 to 30 carbons optionally containing at least one hetero atom selected from the group consisting of nitrogen, oxygen and sulfur, more preferably a hydrocarbon group having 1 to 20 carbons optionally containing at least one hetero atom selected from the group consisting of nitrogen, oxygen and sulfur, and further preferably a hydrocarbon group having 1 to 10 carbons which may contain at least one hetero atom selected from the group consisting of nitrogen, oxygen and sulfur.

In the above formula (6), k is an integer of 1 to 3, preferably an integer of 2 to 3, and more preferably 3.

j is independently an integer of 0 or 1, preferably 0.

A more preferred embodiment of the present invention is a sulfur-containing silane compound in which the $R^1R^2R^3Si$ group is a triethoxysilyl group or a trimethoxysilyl group, and in particular a triethoxysilyl group, in the above formulae (1), (1-1), (1-2), (3), (3-1), (3-2), (4), (4-1), (5), (5-1), (8) to (23) and (8-1) to (23-1).

In a particularly preferred embodiment of the present invention, the compound represented by formula (1) is represented by compounds represented by formulae (24) to (41):

(24)

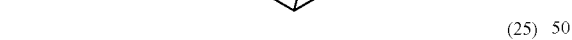

(25)

(26)

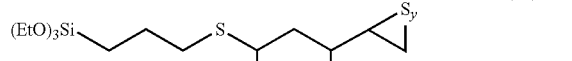

(27)

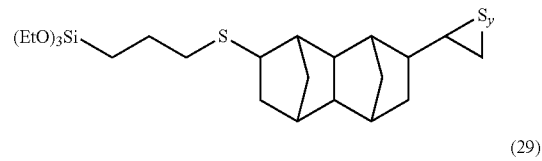

(28)

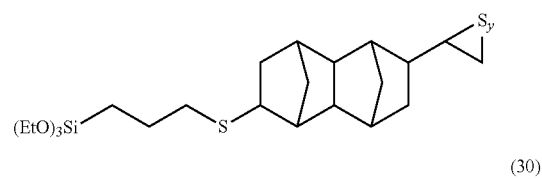

(29)

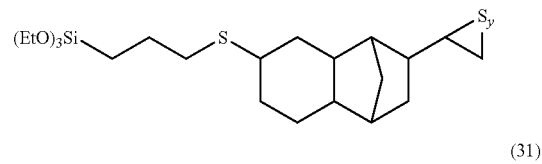

(30)

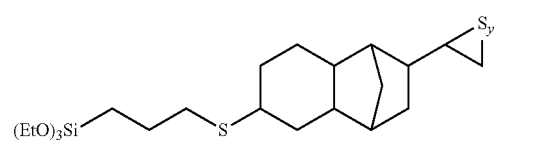

(31)

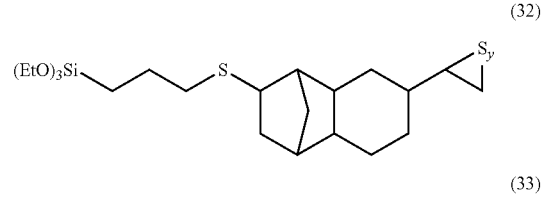

(32)

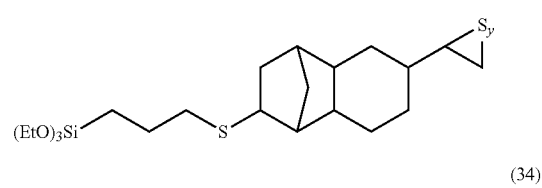

(33)

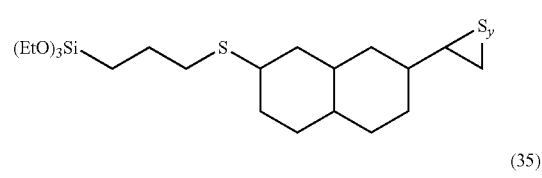

(34)

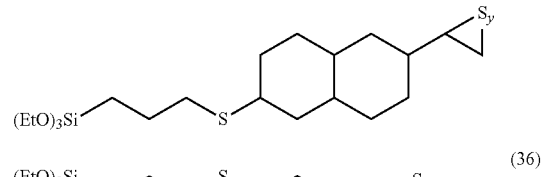

(35)

(36)

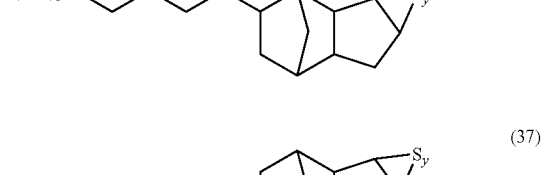

(37)

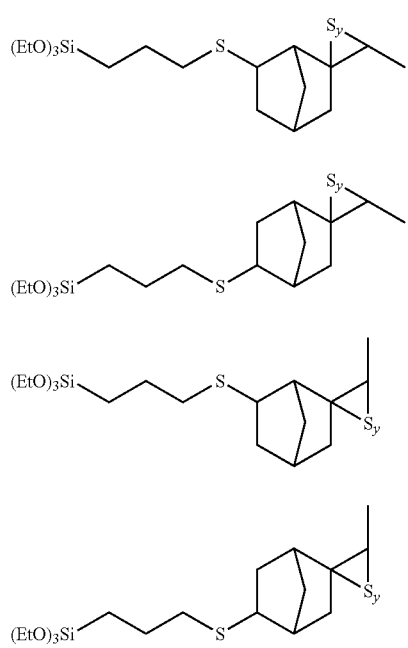

(38)

(39)

(40)

(41)

wherein y is an integer from 1 to 10.

In the compounds represented by formulae (24) to (41) above, y is as described in formula (4) or (5) above.

In the compounds represented by formulae (24) to (41) above, it is inferred that there are two kinds of stereoisomers: an isomer (syn isomer) in which the substituent bonded to the norbornene ring extends forward toward the paper surface in the same manner as the crosslinked structure of the norbornene ring; and an isomer (anti isomer) in which the substituent bonded to the norbornene ring extends backward toward the paper surface in the opposite manner to the crosslinked structure of the norbornene ring.

Therefore, for example, the compounds represented by the above formulae (24) and (25) are considered to be mixtures of the stereoisomers represented by the following formulae.

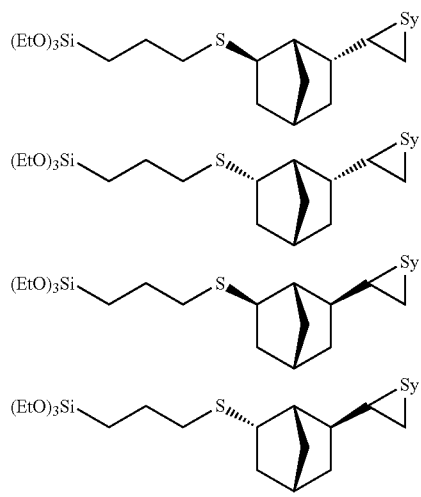

In addition, for example, the compounds represented by the above formulae (28) and (29) are considered to be mixtures of the stereoisomers represented by the following formulae.

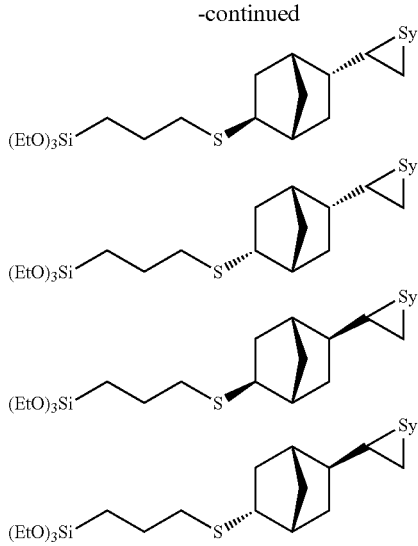

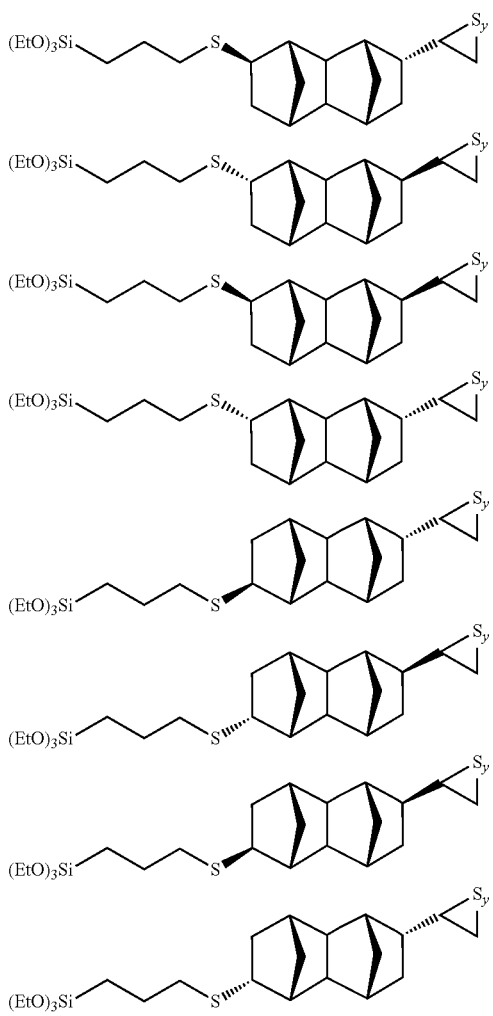

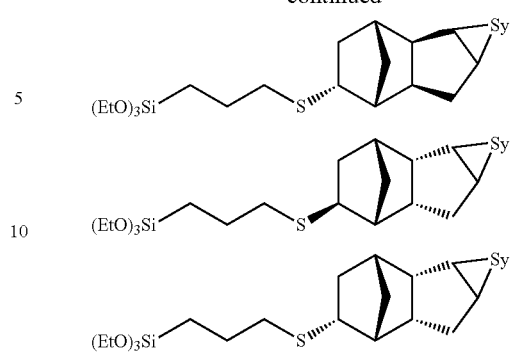
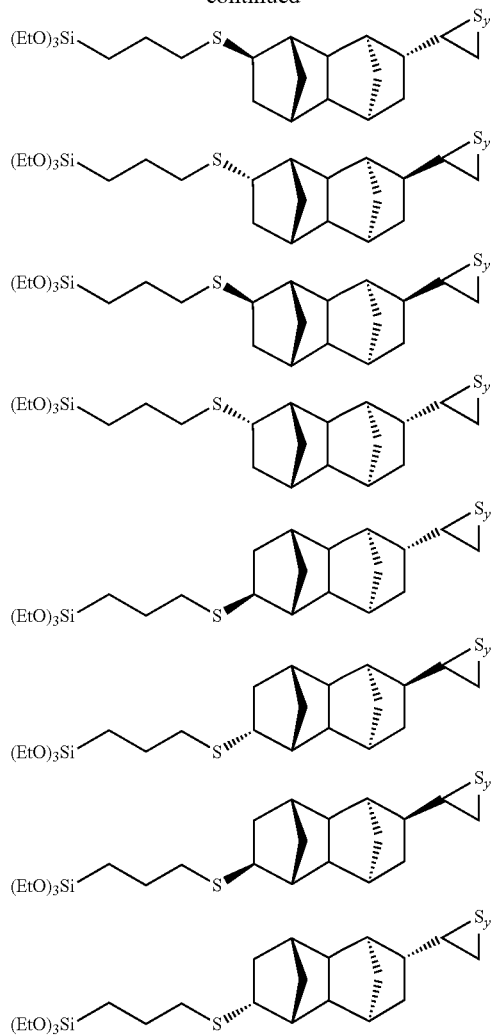
Further, for example, the compounds represented by formulae (38) to (41) are considered to be mixtures of the stereoisomers represented by the following formulae.
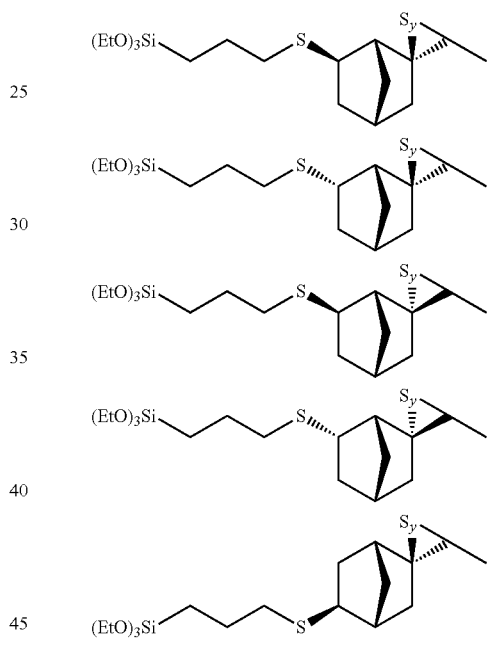
Further, for example, the compounds represented by the above formulae (36) and (37) are considered to be mixtures of the stereoisomers represented by the following formulae.
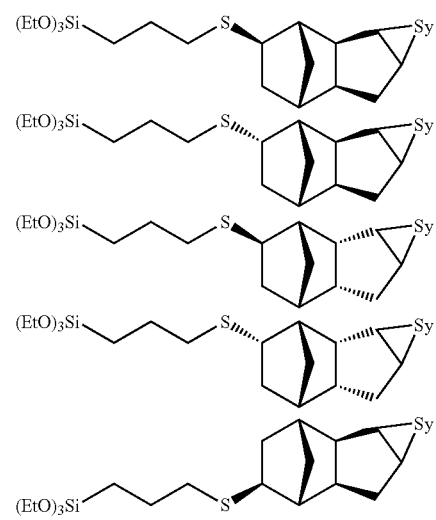
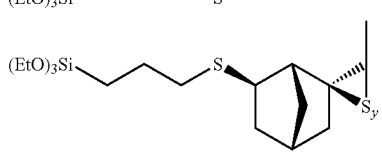

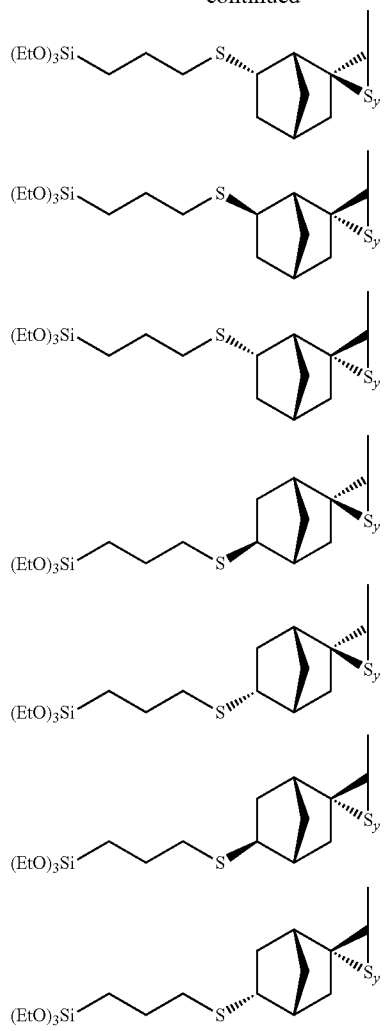
In a particularly preferred embodiment of the present invention, the compound represented by formula (2) is a compound in which A in formula (2) is a bivalent organic group represented by formulae (24-1) to (41-1).
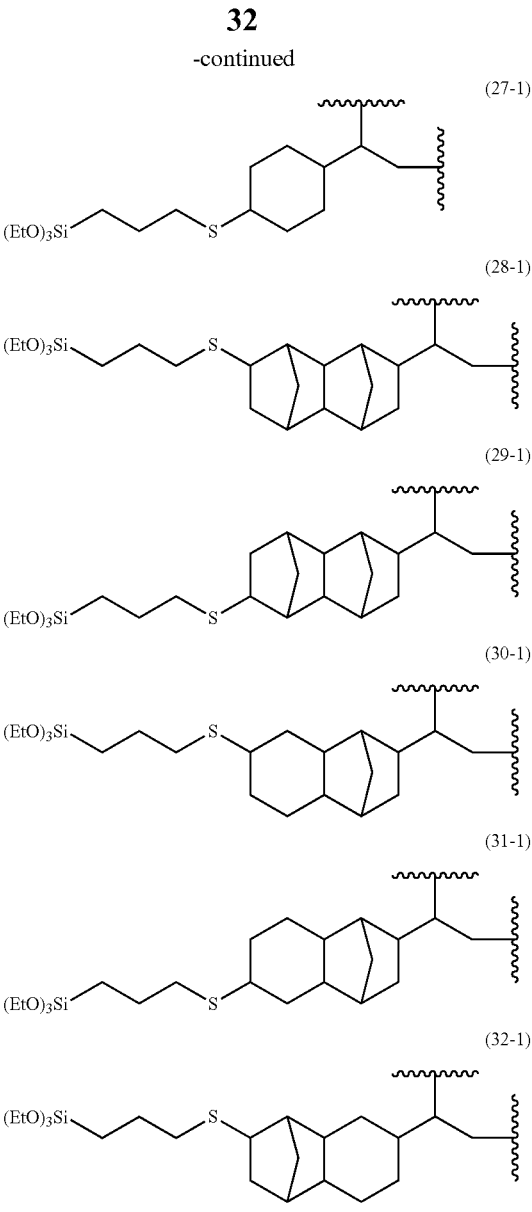

-continued

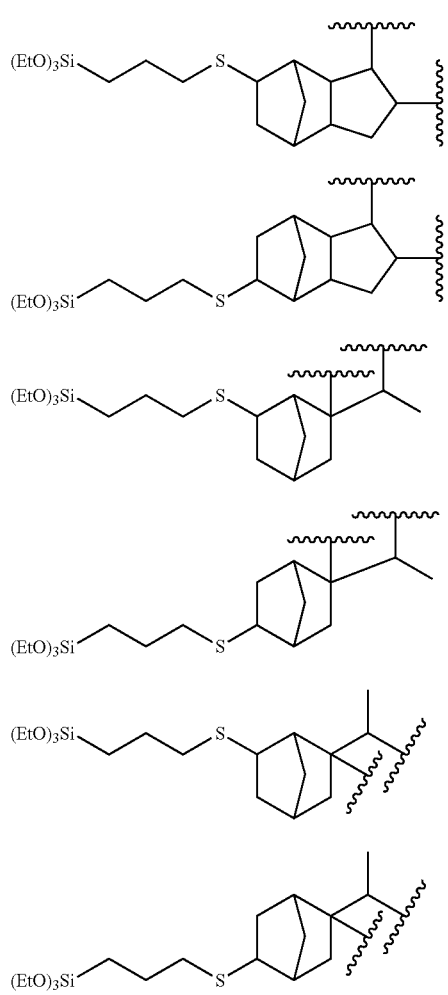

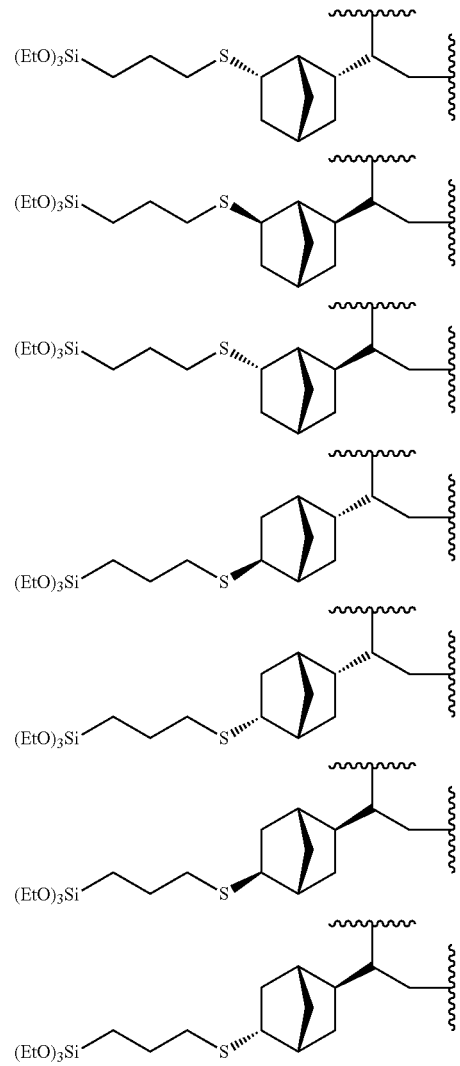

In the chemical structures represented by formulae (24-1) to (41-1) above, the wavy lines represents a binding site with the main chain in the sulfur-containing silane compound represented by formula (2).

In the divalent organic groups represented by the above formulae (24-1) to (41-1), it is inferred that there are two kinds of stereoisomers: an isomer (syn isomer) in which the substituent bonded to the norbornene ring extends forward toward the paper as in the crosslinked structure of the norbornene ring; and an isomer (anti isomer) in which the substituent bonded to the norbornene ring extends backward toward the paper as opposed to the crosslinked structure of the norbornene ring.

Accordingly, for example, the divalent organic groups represented by the above formulae (24-1) and (25-1) are considered to be mixtures of the stereoisomers represented by the following formulae.

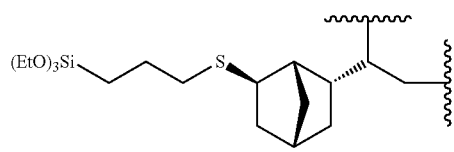

In addition, for example, the divalent organic groups represented by the above formulae (28-1) and (29-1) are considered to be mixtures of a plurality of stereoisomers comprising the stereoisomers represented by the following formulae.

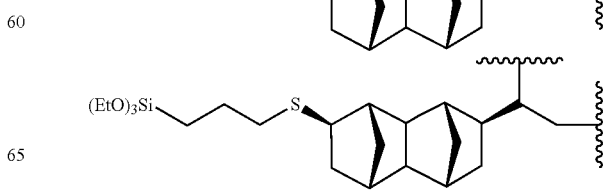

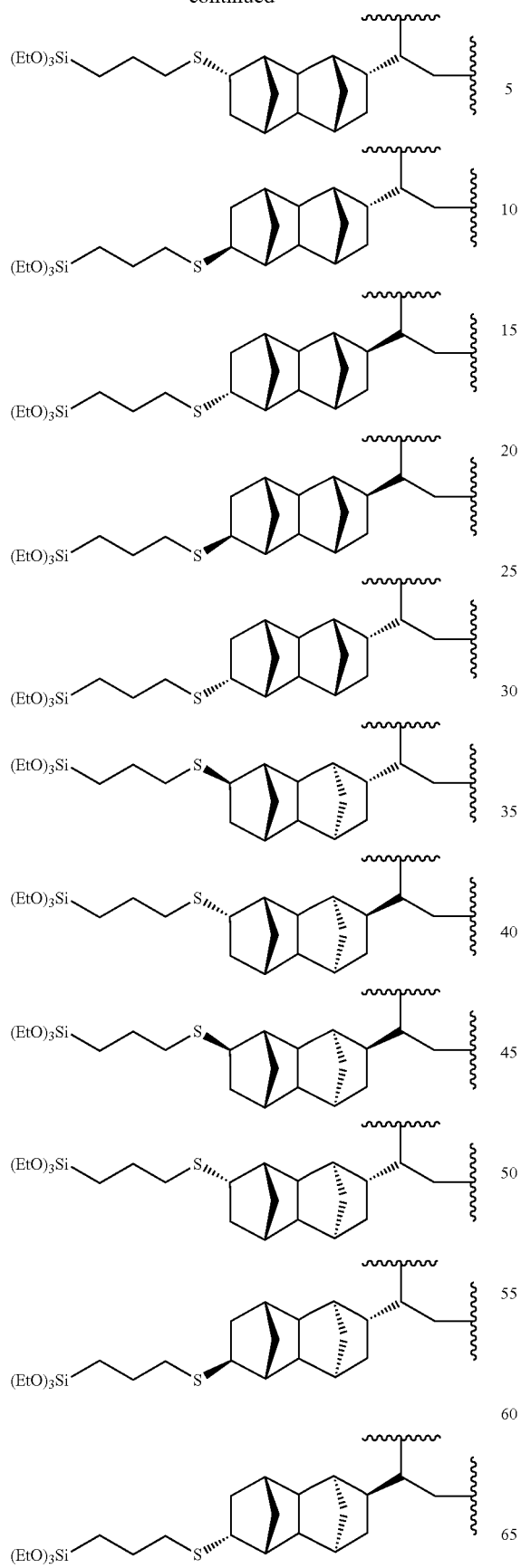
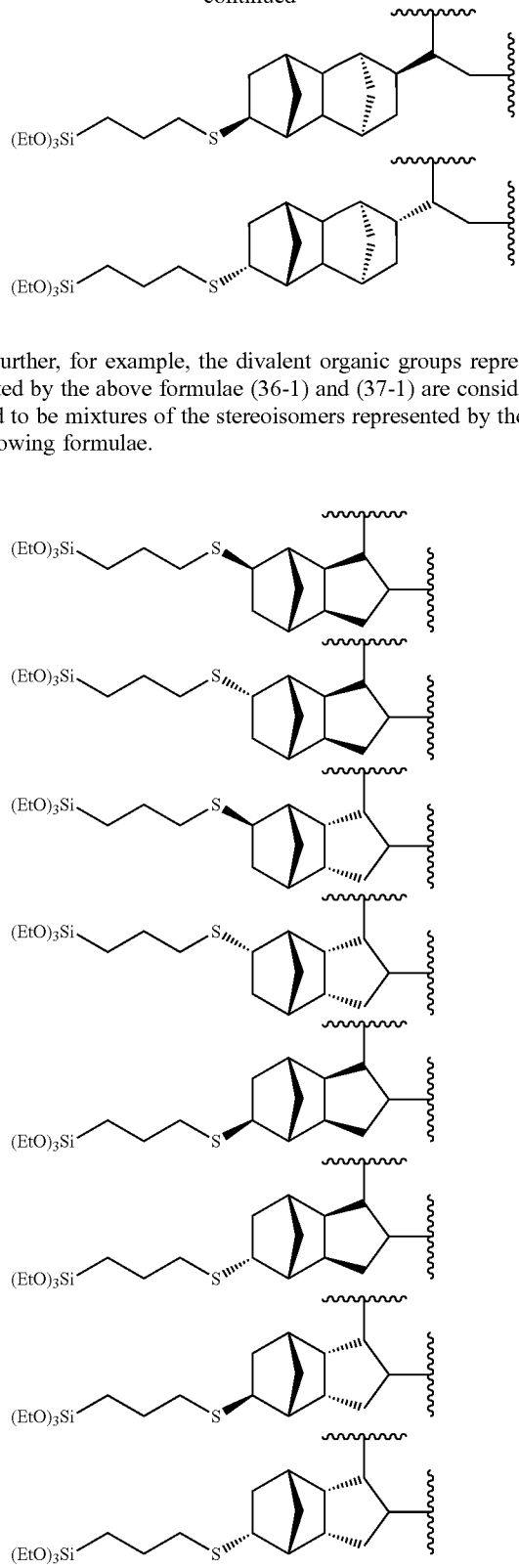
Further, for example, the divalent organic groups represented by the above formulae (36-1) and (37-1) are considered to be mixtures of the stereoisomers represented by the following formulae.
Further, for example, the divalent organic groups represented by formulae (38-1) to (41-1) are considered to be mixtures of the stereoisomers represented by the following formulae.

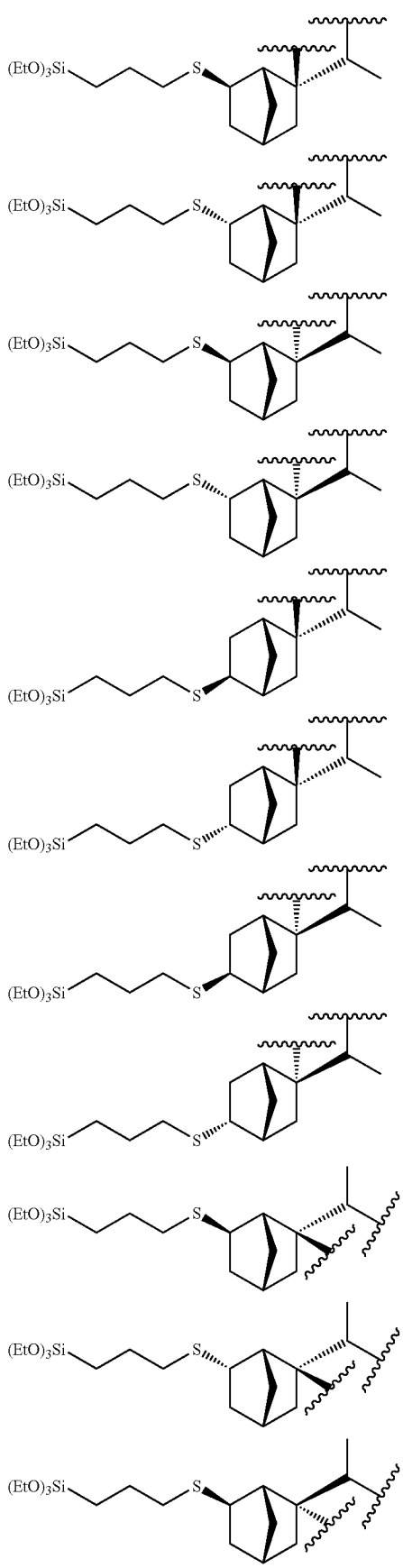
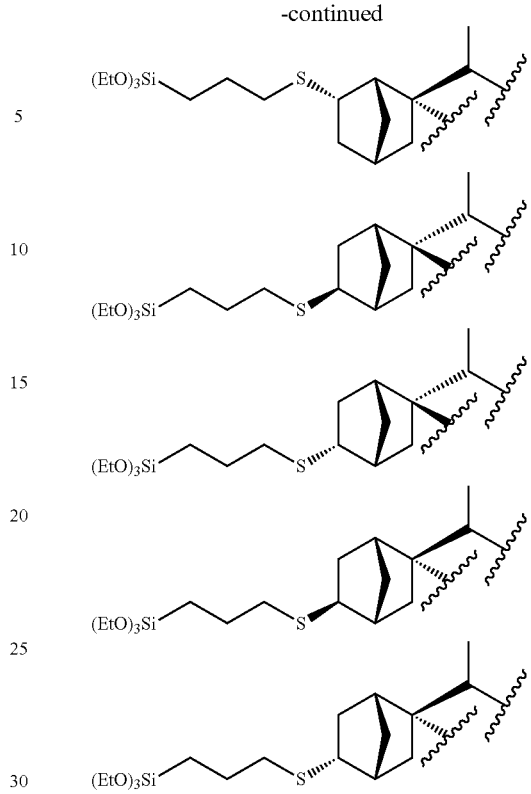

In another embodiment of the present invention, the sulfur-containing silane compound of the present invention is a sulfur-containing silane compound obtained by reacting a compound represented by formula (1') described below with sulfur.

(2) Method for Producing Sulfur-Containing Silane Compound

The compound represented by formula (1) or (2) can be produced by the step of producing a compound represented by formula (1') (step 1-1):

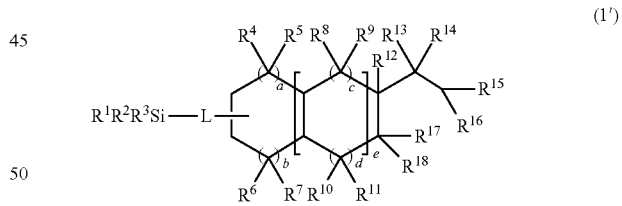

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one hetero atom oxygen atom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer of 0 to 5;
$R^4$, $R^5$, $R^6$, and $R^7$ represent hydrogen, or one of $R^4$ or $R^5$ and $R^6$ or $R^7$ may form a cross-linked structure represented by $-(CH_2)_f-$, and f is an integer from 1 to 5;

$R^8$, $R^9$, $R^{10}$ and $R^{11}$ represent hydrogen atom, or one of $R^8$ or $R^9$ and $R^{10}$ or $R^{11}$ may form a cross-linked structure represented by —$(CH_2)_g$—, g is an integer from 1 to 5, $R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are hydrogen atoms, or $R^{14}$ and $R^{15}$ bond to each other to form a double bond and $R^{12}$, $R^{13}$, and $R^{18}$ are hydrogen atoms; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are hydrogen atoms, by reacting a compound represented by formula (42):

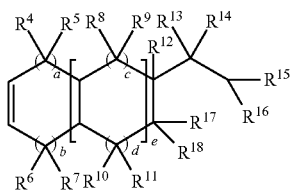

(42)

wherein
a is an integer of 0 or 1;
b is an integer of 0 or 1;
c is each independently an integer of 0 or 1;
d is each independently an integer of 0 or 1;
e is an integer of 0 to 5;
$R^4$, $R^5$, $R^6$, and $R^7$ represent hydrogen, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent hydrogen atom, or one of $R^8$ or $R^9$ and $R^{10}$ or $R^{11}$ may form a cross-linked structure represented by —$(CH_2)_g$—, g is an integer from 1 to 5, $R^{16}$ is a hydrogen atom, a methyl group or an alkyl group having 2 to 8 carbons, $R^{17}$ is a hydrogen atom, a methyl group or an alkyl group having 2 to 10 carbons; where $R^{12}$ and $R^{13}$ bond to each other to form a double bond and $R^{14}$, $R^{15}$, and $R^{18}$ are hydrogen atoms, or $R^{14}$ and $R^{15}$ bond to each other to form a double bond and $R^{12}$, $R^{13}$, and $R^{18}$ are hydrogen atoms; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are hydrogen atoms;

with a compound represented by formula (43):

$R^1R^2R^3Si$—Y (43)

wherein
$R^1$, $R^2$, and $R^3$ each independently represents a hydrocarbon group optionally containing an oxygen atom or a nitrogen atom, or a hydrogen atom; and
Y is a hydrocarbon group optionally containing at least one hetero atom selected from the group consisting of nitrogen, oxygen, and sulfur;
and the step of producing a compound represented by formula (1) or (2) (step 1-2) by reacting the compound represented by formula (1') above and sulfur.

In the above formulae (42), (43) and (1'), $R^{12}$ and $R^{13}$ may each be a hydrogen atom or may be bonded to each other to form a double bond. Also, $R^{14}$ and $R^{15}$ may each be a hydrogen atom or may be bonded to each other to form a double bond. $R^1$ to $R^{11}$, $R^{16}$ to $R^{18}$, L and a to g are as described in the compound represented by formula (1).

In formula (43) above, Y is a hydrocarbon group which may contain at least one hetero atom selected from the group consisting of nitrogen, oxygen, and sulfur, preferably a hydrocarbon group optionally containing at least one hetero atom selected from the group consisting of nitrogen, oxygen, and sulfur of 1 to 30 carbons, more preferably a hydrocarbon group optionally containing at least one hetero atom selected from the group consisting of nitrogen, oxygen and sulfur of 1 to 20 carbons, and further preferably a hydrocarbon group optionally containing at least one hetero atom selected from the group consisting of nitrogen, oxygen and sulfur of 1 to 10 carbons. Among them, Y is particularly preferably a hydrocarbon group containing sulfur. The length of the linear chain portion connecting the portions bonding to the silyl group in the hydrocarbon group and the alicyclic hydrocarbon moiety in the total number of carbon, nitrogen, oxygen, or sulfur atoms is preferably 3 to 8, more preferably 4 to 7, and further preferably 4 to 6 as.

It is possible to synthesize by subjecting the compound represented by formula (42) and the compound represented by formula (43) to an addition reaction or a condensation reaction in Step 1-1 as above. As the addition reaction herein, it is possible to utilize a radical addition reaction, conjugate addition reaction, nucleophilic addition reaction, electrophilic addition reaction, or the like, and for example, it is possible to utilize a reaction similar to a pericyclic reaction, or hydrosilylation reaction, hydroamination reaction, or the like. As the condensation reaction, for example, it is possible to utilize an esterification reaction, amidation reaction, thioesterification reaction, thioamidation reaction, Friedel-Crafts reaction, or the like.

In step 1-2 above, the compound represented by formula (1') and sulfur can be reacted for 3 to 24 hours at a temperature of 80° C. to 180° C. in a nitrogen-substituted environment, for example. Alternatively, they may be reacted in a solvent or without a solvent by adding a catalytic amount of amine or zinc oxide and a vulcanization accelerator catalyst. If necessary, an excess solvent or the like may be removed from the reaction product obtained by distillation.

The compound represented by the above-described formula (42) can be synthesized by a Diels-Alder reaction between the same or different conjugated diene compounds or a Diels-Alder reaction between a conjugated diene compound and an alkene compound based on the knowledge already known to those skilled in the art. The compound represented by formula (42) can be prepared by heat-denaturing, as required, and/or by purifying, as required, the compound synthesized by the Diels-Alder reaction.

The compound represented by formula (3) above or (2'):

H—$S_p$—$\{A$—$S_x\}_m$—E (2')

wherein A is a bivalent organic group represented by formula (3-1):

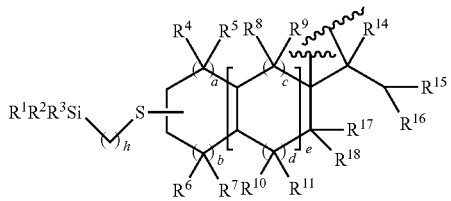

(3-1)

wherein
$R^1$, $R^2$, and $R^3$ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by $-(CH_2)_f-$; f represents an integer of 1 to 5;
$R^8$, $R^9$, $R^{10}$ and $R^{11}$ represent hydrogen; or one of $R^8$ or $R^9$ and $R^{10}$ or $R^{11}$ may form a cross-linked structure represented by $-(CH_2)_g-$; g represents an integer of 1 to 5;
$R^{14}$, $R^{15}$, and $R^{18}$ are hydrogen atoms; $R^{16}$ is a hydrogen atom, a methyl group, or an alkyl group having 2 to 8 carbon atoms; and $R^{17}$ is a hydrogen atom, a methyl group, or an alkyl group having 2 to 10 carbon atoms; and
the wavy line represents a binding site to the main chain in the sulfur-containing silane compound represented by formula (2),
or formula (3-2):

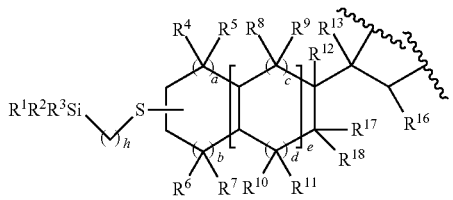

(3-2)

wherein $R^1$, $R^2$, and $R^3$ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by $-(CH_2)_f-$; f represents an integer of 1 to 5;
$R^8$, $R^9$, $R^{10}$ and $R^{11}$ represent hydrogen; or one of $R^8$ or $R^9$ and $R^{10}$ or $R^{11}$ may form a cross-linked structure represented by $-(CH_2)_g-$; g represents an integer of 1 to 5;
$R^{12}$, $R^{13}$, and $R^{18}$ are hydrogen atoms;

$R^{16}$ is a hydrogen atom, a methyl group, or an alkyl group having 2 to 8 carbon atoms; and $R^{17}$ is a hydrogen atom, a methyl group, or an alkyl group having 2 to 10 carbon atoms; and $R^{16}$ and $R^{17}$ may optionally bind to each other to form an alicyclic hydrocarbon of 4 to 9 members;
the wavy line represents a binding site to the main chain in the sulfur-containing silane compound represented by formula (2); and
E represents a hydrogen atom or a substituent represented by formula (3-1-1):

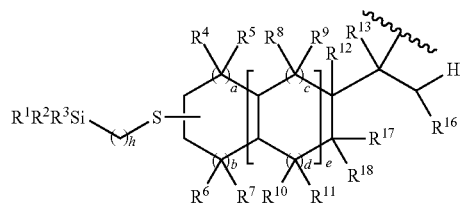

(3-1-1)

formula (3-1-2):

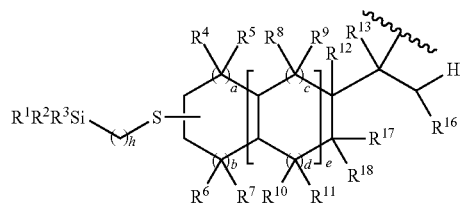

(3-1-2)

formula (3-2-1):

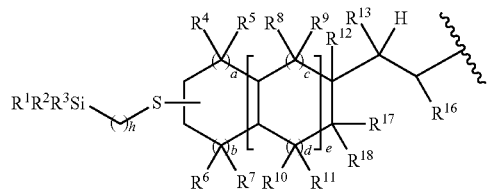

(3-2-1)

formula (3-2-1):

(3-2-2)

wherein $R^1$ to $R^{18}$ and a to e and h are according to formulae (3-1) and (3-2),
the wavy lines represent binding sites with $S_x$;
x each independently represents an integer from 1 to 30;

p represents an integer from 0 to 30;
m represents an integer from 2 to 30,
can be produced by the step of producing a compound represented by formula (3') (step 2-1):

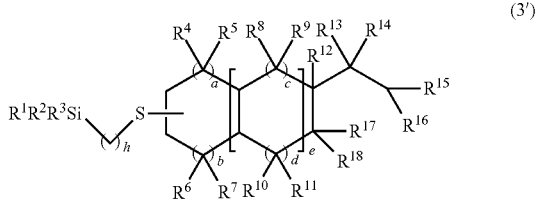

(3')

wherein
$R^1$, $R^2$, and $R^3$ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by $-(CH_2)_r$; f represents an integer of 1 to 5;
$R^8$, $R^9$, $R^{10}$ and $R^{11}$ represent hydrogen; or one of $R^8$ or $R^9$ and $R^{10}$ or $R^{11}$ may form a cross-linked structure represented by $-(CH_2)_g-$; g represents an integer of 1 to 5;
$R^{16}$ is a hydrogen atom, a methyl group, or an alkyl group having 2 to 8 carbon atoms; and $R^{17}$ is a hydrogen atom, a methyl group, or an alkyl group having 2 to 8 carbon atoms; where $R^{12}$ and $R^{13}$ are bonded to each other to form a double bond, and $R^{14}$, $R^{15}$, and $R^{18}$ are hydrogen atoms, or $R^{14}$ and $R^{15}$ are bonded to each other to form a double bond and $R^{12}$, $R^{13}$, and $R^{18}$ are hydrogen atoms,
or $R^{16}$ and $R^{17}$ may optionally bind to each other to form an alicyclic hydrocarbon of 4 to 9 members, where $R^{14}$ and $R^{15}$ are bonded to each other to form a double bond, and $R^{12}$, $R^{13}$, and $R^{18}$ are hydrogen atoms,
by reacting a compound represented by formula (42):

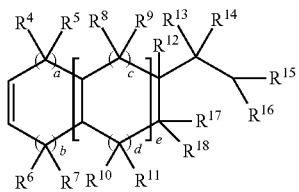

(42)

wherein
a is an integer of 0 or 1;
b is an integer of 0 or 1;
c is each independently an integer of 0 or 1;
d is each independently an integer of 0 or 1;
e is an integer of 0 to 5;
$R^4$, $R^5$, $R^6$, and $R^7$ represent hydrogen, or one of $R^4$ or $R^5$ and $R^6$ or $R^7$ may form a cross-linked structure represented by $-(CH_2)_f-$, and f is an integer from 1 to 5;
$R^8$, $R^9$, $R^{10}$ and $R^{11}$ represent hydrogen atom, or one of $R^8$ or $R^9$ and $R^{10}$ or $R^{11}$ may form a cross-linked structure represented by $-(CH_2)_g-$, g is an integer from 1 to 5,
$R^{16}$ is a hydrogen atom, a methyl group or an alkyl group having 2 to 8 carbons, $R^{17}$ is a hydrogen atom, a methyl group or an alkyl group having 2 to 10 carbons; where $R^{12}$ and $R^{13}$ bond to each other to form a double bond, and $R^{14}$, $R^{15}$, and $R^{18}$ are hydrogen atoms, or $R^{14}$ and $R^{15}$ bond to each other to form a double bond and $R^{12}$, $R^{13}$, and $R^{18}$ are hydrogen atoms; or
$R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are hydrogen atoms,
with a compound represented by formula (44):

(44)

wherein $R^1$, $R^2$, and $R^3$ each independently represents a hydrocarbon group optionally containing an oxygen atom or a nitrogen atom, or a hydrogen atom; and
h is an integer of 1 to 10,
and the step of producing a compound represented by formula (3) or (2') (step 2-2) by reacting a compound represented by formula (3') above with sulfur. c In the above formulae (42), (44) and (3'), $R^{12}$ and $R^{13}$ may each be a hydrogen atom or may be bonded to each other to form a double bond. Also, $R^{14}$ and $R^{15}$ may each be a hydrogen atom or may be bonded to each other to form a double bond. $R^1$ to $R^{11}$, $R^{16}$ to $R^{18}$, and a to g are as described in the compound represented by formula (1). Furthermore, h is as described in the compound represented by formula (3).

It is considered that the compound represented by formula (3') above in the step 2-1 above can be synthesized by mixing the compound represented by formula (42) above and the compound represented by formula (44) above, heating the mixture, and reacting the mercapto group in the compound represented by formula (44) above and the carbon-carbon unsaturated bonding portion in the compound represented by formula (42) above. The compound represented by formula (44) above is preferably mixed in an amount of 0.1 to 4 moles, more preferably 0.3 to 3 moles per 1 mole of the compound represented by formula (42). The heating temperature is preferably 40 to 300° C., more preferably 50 to 200° C.

Examples of the compound represented by formula (44) above include an alkoxysilane compound having a mercapto group. Examples of the alkoxysilane compound having a mercapto group include mercaptotrimethoxysilane, mercaptotriethoxysilane, mercaptomethyltrimethoxysilane, mercaptomethyltriethoxysilane, mercaptomethyltripropoxysilane, 2-mercaptoethyltrimethoxysilane, 2-mercaptoethyltriethoxysilane, 3-mercaptopropyltrimethoxysilane, 4-mercaptobutyltrimethoxysilane, 3-mercaptopropyltriethoxysilane, 4-mercaptobutyltriethoxysilane, 2-mercaptoethyltripropoxysilane, 3-mercaptopropyltripropoxysilane, 4-mercaptobutyltripropoxysilane, 2-mercaptoethylmethyldimethoxysilane, 3-mercaptopropylmethyldimethoxysilane, 4-mercaptobutylmethyldimethoxysilane, 2-mercaptoethylmethyldiethoxysilane, 3-mercaptopropylmethyldiethoxysilane, 4-mercaptobutylmethyldiethoxysilane, and the like.

The compound represented by formula (3') above can also be synthesized by mixing the compound represented by formula (42) above with the compound represented by formula (7) to be described below and heating the mixture. It is considered that a polysulfide bond in the compound represented by formula (7) to be described below causes cleavage and this reacts with the carbon-carbon unsaturated bond moiety in the compound represented by formula (42) above, thereby synthesizing the compound represented by formula (3') above. The compound represented by formula (7) to be described below is preferably mixed in an amount of 0.1 to 4 mol, more preferably 0.3 to 3 mol per 1 mol of the compound represented by formula (42) above. The heating temperature is preferably 40 to 300° C., and more preferably 50 to 200° C.

If necessary, a radical initiator may be used in combination. Examples of the radical initiator include azo compounds such as azobisisobutyronitrile (AIBN) and 1,1'-azobis(cyclohexanecarbonitrile) (ABCN); peroxides such as di-tert-butyl peroxide (t-BuOOBu-t) and tert-butyl hydroperoxide (t-BuOOH), benzoyl peroxide (BPO, PhC(=O)OOC(=O)pH), methyl ethyl ketone peroxide, and dicumyl peroxide (DCP); dihalogen compounds such as chlorine molecules, and redox initiators of a combination of an oxidizing agent and a reducing agent such as hydrogen peroxide and iron(II) salt, persulfate and sodium hydrogen sulfite; triethylborane ($Et_3B$); and diethylzinc ($Et_2Zn$).

Among the compounds represented by formula (7) to be described later, bis[3-(triethoxysilyl)propyl]tetrasulfide may be one commercially available, for example, Si-69 manufactured by Evonik Corporation. Bis[3-(triethoxysilyl)propyl]disulfide may also be one commercially available, for example, Si-75 manufactured by Evonik Corporation.

In step 2-2 above, the compound represented by formula (3') and sulfur can be reacted for 3 to 24 hours at a temperature of 80° C. to 180° C. in a nitrogen-substituted environment, for example. Alternatively, they may be reacted in a solvent or without a solvent by adding a catalytic amount of amine or zinc oxide and a catalyst of a vulcanization accelerator. If necessary, an excess solvent or the like can be distilled off from the reaction product obtained by distillation.

(3) Usefulness of Sulfur-Containing Silane Compound

The sulfur-containing silane compound of the present invention is an excellent silane coupling agent that does not easily cause dispersion failure or mixing failure between an organic polymer material such as rubber and an inorganic material. By using the sulfur-containing silane compound of the present invention, it is possible to improve the viscoelastic properties of a crosslinked product obtained from a rubber composition. Furthermore, the sulfur-containing silane compound of the present invention improves the rolling resistance suppression performance of the crosslinked product obtained from the rubber composition. Furthermore, the sulfur-containing silane compound of the present invention improves the wet grip performance of the crosslinked product obtained from the rubber composition. Furthermore, the sulfur-containing silane compound of the present invention improves the adhesive properties of the crosslinked product obtained from the rubber composition.

The compound represented by formula (1) and the compound represented by formula (2) may each be used alone or as a mixture in any proportion thereof.

3. Composition Comprising Sulfur-Containing Silane Compound

The composition of the present invention comprises a sulfur-containing silane compound represented by formula (1) above and/or a sulfur-containing silane compound represented by formula (2), and a polymer capable of reacting with the sulfur-containing silane compound. Examples of the composition of the present invention include a rubber composition in which the polymer is an elastomer having a glass transition point of 25° C. or lower, comprising an inorganic material, a sealant composition in which the polymer is a sealing polymer, and an adhesive composition in which the polymer is an adhesive, and the like.

(1) Rubber Composition

One preferred embodiment of the composition of the present invention comprises a silane compound represented by formula (1) above and/or a sulfur-containing silane compound represented by formula (2), and an elastomer having a glass transition point of 25° C. or lower, and an inorganic material. These compositions can provide a rubber composition for obtaining a crosslinked product that does not generate poor mixing or dispersion between the elastomer and an inorganic material such as silica and exhibits excellent viscoelastic properties. Also, it is possible to improve rolling resistance suppression performance of the crosslinked product obtained from the rubber composition. Also, it is possible to improve wet grip performance of the crosslinked product obtained from the rubber composition.

Conventionally, reaction of a silane coupling agent with the elastomer above required a substituent with high polarity such as a polysulfide group, mercapto group, epoxy group, and amino group. However, there was a problem that polarity increases as these functional groups are introduced, and in the case of the elastomer above, affinity is impaired, causing poor dispersibility and mixing. Although not bound to a specific theory, the compound represented by formula (1) or formula (2) can be easily co-crosslinked with a diene rubber or the like by cleavage of the sulfur-sulfur bond and/or the sulfur-carbon bond. In addition, the silyl group portion bonded by a side chain having an appropriate length reacts with the silanol group on the surface of the silica, and exhibits reinforcing properties by mediating the reaction between the polymer and the glass or the silica. It is considered that the reaction between the elastomer and the glass or the silica is mediated by adding the compound represented by formula (1) and/or the compound represented by formula (2) to the rubber composition.

(i) Elastomer

The elastomer in the rubber composition of the present invention includes an elastomer having a glass transition temperature (Tg) of 25° C. or lower. According to one preferred embodiment of the present invention, the elastomer in the rubber composition of the present invention includes an elastomer having a glass transition temperature (Tg) of 0° C. or lower. The glass transition temperature (Tg) of the elastomer in the rubber composition of the present invention within this range is preferable because the rubber composition exhibits rubber-like elasticity at room temperature. In the present invention, the glass transition temperature (Tg) is a glass transition point measured by differential scanning calorimetry (DSC-Differential Scanning Calorimetry). The heating rate is preferably 10° C./min.

The elastomer in the rubber composition of the present invention include natural rubber, butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, chloroprene rubber, butyl rubber and halogenated isobutylene-p-methylstyrene rubber, among which natural rubber, butadiene rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, butyl rubber, and halogenated isobutylene-p-methylstyrene rubber, which are preferred, and amongst these, natural rubber, butadiene rubber, isoprene rubber, styrene-butadiene rubber, isoprene-butadiene rubber, styrene-isoprene-butadiene rubber, halogenated butyl rubber, butyl rubber, and halogenated isobutylene-p-methylstyrene rubber are further preferred, and amongst these, natural rubber, styrene-butadiene rubber and butadiene rubber are more preferred. The elastomer in the rubber composition of the present invention may be one or two or more of the above-mentioned rubbers.

The weight average molecular weight of the elastomer in the rubber composition of the present invention is preferably 1,000 to 3,000,000, and further preferably 10,000 to 1,000,000. In the present invention, the weight average molecular weight is a weight average molecular weight (in terms of polystyrene) as measured by gel permeation chromatography (GPC). It is preferable to use tetrahydrofuran (THF), N,N-dimethylformamide (DMF), and chloroform as solvents for the measurement.

The total of the content of the compound represented by formula (1) and the content of the compound represented by formula (2) in the rubber composition of the present invention is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, and particularly further preferably 1 to 3.4 parts by mass, with respect to 100 parts by mass of the elastomer. The total of the content of the compound represented by formula (1) and the content of the compound represented by formula (2) is preferably 0.1 to 30 parts by mass, more preferably 0.5 to 20 parts by mass, and further preferably 1.0 to 15 parts by mass, with respect to 100 parts by mass of the total amount of the inorganic material contained in the rubber composition.

By including the compound represented by formula (1) and/or the compound represented by formula (2) above in the rubber composition of the present invention, it is possible to improve viscoelastic properties of the cross-linked product to be obtained. Also, rolling resistance suppressing performance of the crosslinked product obtained from the rubber composition can be improved. Further, wet grip performance of the crosslinked product obtained from the rubber composition can also be improved.

(ii) Sulfur-Containing Silane Compounds Other than the Compound Represented by Formula (1) or Formula (2)

The rubber composition of the present invention may further include a sulfur-containing silane compound other than the compound represented by formula (1) or formula (2) (also referred to as "other sulfur-containing silane compound" in the present specification). When a rubber composition containing a sulfur-containing silane compound other than the compound represented by formula (1) or formula (2) is subjected to a vulcanization reaction, the sulfur-containing silane compound other than the compound represented by formula (1) or formula (2) is incorporated into the vulcanization reaction, so that the sulfur-containing silane compound other than the compound represented by formula (1) or formula (2) functioning as a silane coupling agent and the compound represented by formula (1) or formula (2) react with each other. This reaction is considered to generate a synergistic effect of increasing coupling efficiency.

The content of the sulfur-containing silane compound other than the compound represented by formula (1) or formula (2) is preferably 0.01 to 27 parts by mass and more preferably 0.03 to 18 parts by mass with respect to 100 parts by mass of the elastomer. The content of the sulfur-containing silane compound other than the compound represented by formula (1) or formula (2) is preferably 0.01 to 27 parts by mass, more preferably 0.05 to 18 parts by mass, further preferably 0.1 to 13.5 parts by mass with respect to 100 parts by mass of the total amount of the inorganic material contained in the rubber composition.

The total amount of the content of the compound represented by formula (1) and the content of the compound represented by formula (2) and the sulfur-containing silane compound other than the compound represented by formula (1) or formula (2) in the rubber composition of the present invention is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, particularly further preferably 1 to 3.4 parts by mass with respect to 100 parts by mass of the elastomer. Also, the total amount of the content of the compound represented by formula (1) and the content of the compound represented by formula (2) and the sulfur-containing silane compound other than the compound represented by formula (1) is preferably 0.1 to 30 parts by mass, more preferably 0.5 to 20 parts by mass, further preferably 1.0 to 15 parts by mass, based on the total of 100 parts by mass of the inorganic material contained in the rubber composition.

In the rubber composition of the present invention, the proportion of the content of the sulfur-containing silane compound other than the compound represented by formula (1) or formula (2) to the total amount of the content of the compound represented by formula (1) and the content of the compound represented by formula (2) and the silane compound other than the compound represented by formula (1) or formula (2) is preferably 0.1 to 0.9 and more preferably 0.2 to 0.8 on a mass basis.

As for the sulfur-containing silane compound other than the compound represented by formula (1) or formula (2), use may be made to, for example, a compound represented by formula (7):

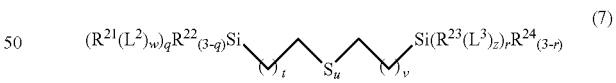

wherein
t and v are each independently an integer of 0 to 10;
u is an integer of 2 to 10;
q and r are each independently an integer of 1 to 3;
w and z are each independently an integer of 0 or 1;
$L^2$ and $L^3$ are each independently a hydrocarbon group optionally containing at least one heteroatom selected from the group consisting of nitrogen, oxygen and sulfur;
$R^{21}$ and $R^{23}$ are each independently an alkoxy group or an amino group substituted with one or more alkyl groups; and
$R^{22}$ and $R^{24}$ are each independently hydrogen or an alkyl group.

In formula (7) above, t and v each independently represent an integer of 0 to 10, preferably an integer of 0 to 5, more preferably an integer of 1 to 3, and further preferably 2.

u represents an integer of 2 to 10 and more preferably an integer of 2 to 8.

g and r each independently represents an integer of 1 to 3, preferably an integer of 2 to 3, and more preferably 3.

w and z each independently represents an integer of 0 or 1 and preferably 0. $L^2$ and $L^3$ are each independently a hydrocarbon group optionally containing at least one heteroatom selected from the group consisting of nitrogen, oxygen, and sulfur, preferably a hydrocarbon group having 1 to 30 carbons, optionally containing at least one heteroatom selected from the group consisting of nitrogen, oxygen, and sulfur, more preferably a hydrocarbon group having 1 to 20 carbons, optionally containing at least one heteroatom selected from the group consisting of nitrogen, oxygen, and sulfur, and further preferably a hydrocarbon group having 1 to 10 carbons, optionally containing at least one heteroatom selected from the group consisting of nitrogen, oxygen, and sulfur.

$R^{21}$ and $R^{23}$ each independently represents a hydrolyzable group, and an alkoxy group, more preferably an alkoxy group having 1 to 30 carbons, more preferably an alkoxy group having 1 to 20 carbons, or an amino group substituted with one or more alkyl groups, more preferably an amino group substituted with one or more alkyl groups having 1 to 30 carbons, and more preferably an amino group substituted with one or more alkyl groups having 1 to 20 carbons. Specifically, examples of the alkoxy group include a methoxy group, ethoxy group, propoxy group, isopropoxy group, butoxy group, and isobutoxy group, and among these, a methoxy group or an ethoxy group is preferable. Examples of the amino group substituted with one or more alkyl groups include an N-methylamino group, N,N-dimethylamino group, N-ethylamino group, N,N-diethylamino group, and N-isopropylamino group, and among these, an N-methylamino group or an N-ethylamino group is preferable. Note that, the alkoxy group and the amino group may be bonded to silicon (Si) via a connecting group consisted of a hydrocarbon group optionally containing at least one heteroatom selected from the group consisting of nitrogen, oxygen, and sulfur.

In addition, $R^{22}$ and $R^{24}$ each independently represents hydrogen or an alkyl group, more preferably an alkyl group having 1 to 30 carbons, further preferably an alkyl group having 1 to 20 carbons, and specific examples thereof include a methyl group, ethyl group, propyl group, isopropyl group, butyl group, isobutyl group, tert-butyl group, pentyl group, cyclopentyl group, hexyl group, and cyclohexyl group, among which a methyl group and an ethyl group are preferable.

The content of the compound represented by formula (7) above in the rubber composition of the present invention is preferably 0.01 to 27 parts by mass and more preferably 0.03 to 18 parts by mass with respect to 100 parts by mass of the elastomer. The content of the compound represented by formula (7) above in the rubber composition of the present invention is preferably 0.01 to 27 parts by mass, more preferably 0.05 to 18 parts by mass, further preferably 0.1 to 13.5 parts by mass with respect to 100 parts by mass of the total amount of the inorganic material contained in the rubber composition.

As for the sulfur-containing silane compound other than the compound represented by the formula (1) or (2), a compound represented by formula (44), particularly a silane compound having the following structure can be used in addition to the compound represented by the formula (7) above.

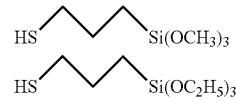

(iii) Inorganic Material

Examples of the inorganic material contained in the rubber composition of the present invention include silica, carbon black, calcium carbonate, titanium oxide, clay and talc, among which silica or carbon black is preferably used because the mechanical properties and heat resistance can be further improved.

Silica is not particularly limited, and examples thereof include dry process silica, wet process silica, colloidal silica, precipitated silica, and the like. Among these, wet process silica mainly constituted of hydrated silicic acid is preferable. These silicas may be each used alone, or two or more of those in combination is possible, in an amount of 10 to 300 parts by mass based on 100 parts by mass of the elastomer. The specific surface area of these silicas is not particularly limited, and it is preferable when the nitrogen adsorption specific surface area (BET method) is usually in the range from 10 to 400 $m^2/g$, preferably from 20 to 300 $m^2/g$, and further preferably from 120 to 190 $m^2/g$, because improvements are sufficiently achieved in reinforcing properties, abrasion resistance, heat generation and the like. Here, the nitrogen adsorption specific surface area is a value measured by the BET method in accordance with ASTMD 3037-81.

Carbon black is appropriately selected and used according to the application. In general, carbon black is classified into hard carbon and soft carbon based on the particle size. Soft carbon has low reinforcing properties against rubber, and hard carbon has high reinforcing properties against rubber. In the rubber composition of the present invention, it is preferable to specifically use hard carbon with high reinforcing properties. Preferably, the content is 10 to 300 parts by mass, preferably 20 to 200 parts by mass, more preferably 30 to 150 parts by mass, based on 100 parts by mass of the elastomer.

The amount of the inorganic material added is preferably 0.1 to 500 parts by mass and more preferably 1 to 300 parts by mass based on 100 parts by mass of the elastomer.

(iv) Other Processing Aids

The rubber composition of the present invention may contain other processing aids as long as the function is not impaired such as a vulcanizing agent such as sulfur and zinc oxide, crosslinking agent, vulcanization accelerator, crosslinking accelerator, vulcanization acceleration aid, anti-aging agent, softening agent, various oils, antioxidant, anti-aging agent, filler, and a plastic material.

Examples of the anti-aging agent include compounds such as hindered phenol compounds, aliphatic compounds and aromatic hindered amine compounds, and they are added in an amount of 0.1 to 10 parts by mass, more preferably 1 to 5 parts by mass, based on 100 parts by mass of the elastomer. Examples of the antioxidant include butyl hydroxy toluene (BHT), butyl hydroxy anisole (BHA), and the like. They are preferably added in an amount of 0.1 to 10 parts by mass, more preferably 1 to 5 parts by mass, based on 100 parts by mass of the elastomer.

Examples of a colorant include inorganic pigments such as titanium dioxide, zinc oxide, ultramarine, red iron oxide, lithopone, lead, cadmium, iron, cobalt, aluminum, hydrochloride, and sulfate, azo pigment, copper phthalocyanine pigment, and the like. They are added in an amount from 0.1 to 10 parts by mass, more preferably 1 to 5 parts by mass, based on 100 parts by mass of the elastomer.

Examples of the vulcanizing agent include sulfur-based vulcanizing agents such as powder sulfur, precipitated sulfur, highly dispersible sulfur, surface-treated sulfur, insoluble sulfur, dimorpholin disulfide, and alkylphenol disulfide, and zinc oxide, magnesium oxide, litharge, p-quinone dioxam, p-dibenzoylquinonedioxime, tetrachloro-p-benzoquinone, poly-p-dinitrobenzene, methylenedianiline, phenol resin, brominated alkylphenol resin, chlorinated alkylphenol resin, and the like.

Examples of the vulcanization accelerator include fatty acids such as acetyl acid, propionic acid, butane acid, stearic acid, acrylic acid, and maleic acid; fatty acid zincs such as zinc acetylate, zinc propionate, zinc butanoate, zinc stearate, zinc acrylate, and zinc maleate; and fatty acid zinc, and zinc oxide.

Examples of the vulcanization acceleration aid include thiurams such as tetramethylthiuram disulfide (TMTD), tetraethylthiuram disulfide (TETD), and tetramethylthiuram monosulfide (TMTM); aldehyde/ammonias such as hexamethylenetetramine; guanidines such as diphenylguanidine; thiazoles such as 2-mercaptobenzothiazole (MBT) and dibenzothiazyl disulfide (DM); sulfenamides such as N-cyclohexyl-2-benzothiazyl sulfenamide (CBS) and N-t-butyl-2-benzothiazyl sulfenamide (BBS); and dithiocarbamates such as dimethyl dithiocarbamic acid (ZnPDC).

In the present invention, other processing aids can be used as a rubber composition by kneading with a known rubber kneading machine, for example, a roller, Banbury mixer, kneader, and the like, and vulcanizing under any conditions. The amount of these other processing aids to be added can also be set to a conventional general amount as long as it does not detract from the purpose of the present invention.

(V) Method for Producing Rubber Composition

The method for producing a rubber composition of the present invention comprises a step of kneading the sulfur-containing silane compound, the elastomer having a glass transition point of 25° C. or lower, and the inorganic material. The process for producing a rubber composition of the present invention preferably comprises a step of kneading the sulfur-containing silane compound, the elastomer having a glass transition point of 25° C. or lower, the inorganic material, and the vulcanization acceleration aid.

The method for producing the rubber composition described above may preferably further comprise a step of kneading the vulcanizing agent. More preferably, the method for producing the rubber composition may further comprise a step of kneading the vulcanizing agent and the vulcanization accelerator.

The content of the sulfur-containing silane compound in the rubber composition is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, and particularly further preferably 1 to 3.4 parts by mass, based on 100 parts by mass of the elastomer. When the sulfur-containing silane compound contains a sulfur-containing silane compound other than the compound represented by formula (1) or (2), the proportion of the content of the sulfur-containing silane compound other than the compound represented by formula (1) or (2) to the total of the content of the compound represented by formula (1), the content of the compound represented by formula (2) and the content of the sulfur-containing silane compound other than the compound represented by formula (1) or (2) is preferably 0.1 to 0.9 and more preferably 0.2 to 0.8 on a mass basis.

In each of the above-mentioned steps, the above-mentioned other processing aids may be appropriately blended within a range not impairing the function of the rubber composition.

(vi) Cross-Linked Product of the Rubber Composition of the Present Invention

Using the rubber composition of the present invention, a cross-linked product of the rubber composition can be produced according to conventionally known methods and common general knowledge widely known to those skilled in the art. For example, the rubber composition is extruded, then molded using a molding machine, subsequently heated and pressurized using a vulcanizing machine, thereby forming a cross-link to give a cross-linked product.

(vii) Tire

Using the rubber composition, a tire can be produced by a conventionally known method and common general knowledge widely known to a person skilled in the art. For example, the rubber composition is extruded and then molded using a tire molding machine, subsequently heated and pressurized using a vulcanizing machine, thereby forming a cross-link to give a tire. In one embodiment, the tire of the present invention is a tire comprising the cross-linked product.

By producing a tire using the rubber composition of the present invention, viscoelastic properties of the produced tire can be improved. In addition, it is possible to improve rolling resistance suppression performance of the produced tire. In addition, it is possible to improve wet grip performance of the produced tire.

(2) Sealant Composition

Another preferred embodiment of the composition of the present invention comprises a compound represented by formula (1) above and/or a compound represented by formula (2), and a sealing polymer (sealing agent). These compositions can improve the adhesion between the sealing agent composition and the inorganic material.

Conventionally, reaction of a silane coupling agent with an elastomer required a substituent with high polarity such as a polysulfide group, mercapto group, epoxy group, and amino group. However, there was a problem that polarity increases as these functional groups are introduced, and in the case when mixing is done with a polymer with low-sealing properties of low polarity, affinity is impaired, causing poor dispersibility and mixing. Although not bound to a specific theory, the compound of formula (1) and/or the compound represented by formula (2) can co-cross-link with diene-based rubber, etc. by making its sulfur-sulfur bond and/or sulfur-carbon bond cleave. The silyl group portion which is bonded by a side chain having an adequate length reacts with a silanol group of the silica surface, and exhibits reinforcing properties by mediating the reaction between the polymer and the glass or silica. It is considered that addition of the compound represented by formula (1) and/or the compound represented by formula (2) above mediates the reaction between the polyurethane and glass or silica, whereby reinforcement properties are exhibited. As a result, a sealant composition containing the compound represented by formula (1) and/or the compound represented by formula (2) above or an adhesive composition has excellent tensile properties, the sealant composition or the adhesive composition is considered to exhibit excellent adhesion properties.

The total of the content of the compound represented by formula (1) and the compound represented by formula (2) above in the sealant composition of the present invention is preferably 0.1 to 30 parts by mass, more preferably 1 to 20 parts by mass, based on 100 parts by mass of the sealant composition.

The sealing polymer is not particularly limited, and may be a one-part curing type (moisture curing, oxygen curing, drying curing, non-curing type) or a two-part curing type (reaction curing type), and examples thereof include acrylic polymers, acrylic urethane polymers, polyurethane polymers, silicone polymers, modified silicone polymers, polysulfide polymers, SBR polymers, butyl rubber polymers, and oil-based caulking polymers, which preferred among these are the one-part curing type polyurethane polymers, silicon polymers, modified silicon polymers, polysulfide polymers, and butyl rubber polymers. The sealant composition of the present invention may include one or two or more of the above-described sealing polymers.

The weight average molecular weight of the sealing polymer is preferably 300 to 500,000, more preferably 1,000 to 300,000.

The sealant composition of the present invention may contain a silane compound other than the compound represented by formula (1) or (2) above.

The sealant composition of the present invention may contain additives such as an antioxidant, anti-aging agent, antistatic agent, thermal stabilizer, ultraviolet absorber, light stabilizer, flame retardant, nucleating agent, clearing agent, processing improver, lubricant, filler, plasticizer, filler, antiblocking agent, crosslinking agent, dye and pigment, etc., as long as the effect is not impaired.

The material of the adherend is not particularly limited, and examples thereof include metals such as stainless steel, aluminum, copper, and iron; plastics such as nylon, styrol, acryl, vinyl chloride, ABS, FRP, and polycarbonate; rubbers such as natural rubber, synthetic rubber, and silicone rubber; inorganic materials such as concrete, mortar, natural stone, tile, glass, and ceramic; natural materials such as wood, plywood, leather, and thick paper; and polyethylene, polypropylene, fluorine resin, and polyacetal.

(3) Adhesive Composition

In yet another preferred embodiment of the composition of the present invention, the adhesive composition of the present invention comprises a compound represented by formula (1) and/or the compound represented by formula (2) above and an adhesive (adhesive polymer). By virtue of these compositions, adhesion between the adhesive composition and the inorganic material can be improved.

The total of the content of the compound represented by formula (1) and the compound represented by formula (2) above in the adhesive composition of the present invention is preferably 0.1 to 30 parts by mass and more preferably 1 to 20 parts by mass, based on 100 parts by mass of the adhesive composition.

The adhesive may be of a one-part curing type or a two-part curing type, and may be any of a water dispersion type, solution type, reaction type, solid type, and tape type. In addition, the adhesive may be an organic adhesive or an inorganic adhesive.

Examples of organic adhesives include synthetic adhesives such as vinyl acetate adhesives, vinyl acetate resin emulsion adhesives, vinyl resin adhesives, ethylene-vinyl acetate resin emulsion adhesives, polyvinyl resin acetate solution-based adhesives, ethylene-vinyl acetate resin hot-melt adhesives, epoxy resin adhesives, epoxy resin emulsion adhesives, polyvinyl alcohol adhesives, ethylene-vinyl acetate adhesives, vinyl chloride adhesives, vinyl chloride resin solvent-based adhesives, aqueous polymer-isocyanate adhesives, α-olefin adhesives, acrylic resin adhesives, acrylic resin anaerobic adhesives, acrylic resin emulsion adhesives, acrylic resin adhesive tapes, polyamide adhesives, polyamide resin hot-melt adhesives, polyimide adhesives, cellulose adhesives (ether cellulose, nitrocellulose, etc.), polyvinylpyrrolidone adhesives, polystyrene adhesives, polystyrene resin solvent-based adhesives, cyanoacrylate adhesives, polyvinyl acetal adhesives, urethane resin adhesives, urethane resin solvent-based adhesives, urethane resin emulsion adhesives, polyurethane resin hot-melt adhesives, polyolefin resin hot-melt adhesives, polyvinyl butyral resin adhesives, polyaromatic adhesives, structural acrylic resin adhesives, urea resin adhesives, melamine resin adhesives, phenol resin adhesives, resorcinol adhesives, ester adhesives, chloroprene rubber-based adhesives, nitrile rubber-based adhesives, styrene butadiene rubber adhesives, styrene-butadiene rubber-based latex adhesives, polybenzimidazole adhesives, polymethacrylate resin solution-based adhesives, thermoplastic elastomer adhesives, butyl rubber adhesives, silicone adhesives, modified silicone adhesives, silylated urethane adhesives, urethane rubber adhesives, polysulfide adhesives, acrylic rubber adhesives; natural adhesives such as starch adhesives, natural rubber adhesives, natural rubber latex adhesives, asphalt, cement, gum arabic, Japanese lacquer, casein, soybean protein, and pine tar; and reactive hot-melt adhesives.

Examples of inorganic adhesives include silica adhesives, solder, water glass (soda silicate, sodium silicate), cement (Portland cement, cement plaster, gypsum, magnesium cement, litharge cement, dental cement, etc.) and ceramics.

Among the adhesives above, when the material of the adherend is thick paper or wood, cellulose adhesives, vinyl acetate adhesives, vinyl acetate resin emulsion adhesives, starch adhesives, polyvinyl alcohol adhesives and polyvinyl pyrrolidone adhesives are preferable. When the material of the adherend is plastic, vinyl adhesives, styrene resin adhesives, epoxy resin adhesives and cyanoacrylate adhesives are preferable. When the material of the adherend is rubber or leather, chloroprene rubber adhesives, nitrile rubber adhesives and styrene butadiene rubber adhesives are preferable. When the material of the adherend is metal, ceramic, or concrete, epoxy resin adhesives, silicone adhesives and vinyl acetate adhesives are preferable. From the viewpoint of compatibility and stability, epoxy adhesives are preferable. The adhesive composition of the present invention may include one or two or more of the above-described adhesives.

The adhesive preferably has a weight average molecular weight of 300 to 500,000, more preferably 1,000 to 300,000.

The adhesive composition of the present invention may contain a sulfur-containing silane compound other than the compound represented by formula (1) or (2) above.

The adhesive composition of the present invention may contain additives such as an antioxidant, anti-aging agent, antistatic agent, thermal stabilizer, ultraviolet absorber, light stabilizer, flame retardant, nucleating agent, clearing agent, processing improver, lubricant, etc., as long as the effect is not impaired.

4. Surface Treatment Method for Inorganic Material

The compound represented by formula (1) and/or the compound represented by formula (2) above can be used for surface treatment of an inorganic material. Examples of the surface treatment method include (1) a dry method, (2) a wet method, and (3) an integral blend method.

The dry method is suitable for surface treatment of a large amount of inorganic material by spraying or blowing in a vapor state of a sulfur-containing silane compound while stirring the inorganic material well.

The dry process also includes a heat treatment step as necessary. This method is excellent in workability because a diluent is not used.

The wet method is performed by dispersing an inorganic material in a solvent, diluting a sulfur-containing silane compound in water or an organic solvent, and adding in a slurry state while vigorously stirring. According to this method, a uniform surface treatment can be achieved.

The integral blending method is performed by adding a sulfur-containing silane compound directly to an organic resin while mixing the inorganic material with the organic resin. This method is widely used in industry because of its simplicity. When the sulfur-containing silane compound acts on the inorganic material in this method, there are three steps to go through, of transfer of the sulfur-containing silane compound to the filler surface, hydrolysis, and condensation. Therefore, in this method, it is necessary to pay attention to the reactivity of the sulfur-containing silane compound with the organic resin.

The addition amount of the sulfur-containing silane compound can be generally calculated by the following formula.

Addition amount (g)=[mass of inorganic material (g)×specific surface area of inorganic material $(m^2/g)$]/minimum coating area of sulfur-containing silane compound $(m^2/g)$.

Note that, the minimum coating area of the sulfur-containing silane compound can be calculated from the following formula.

Minimum coating area $(m^2/g)=6.02\times10^{23}\times13\times10^{-20})/$ molar weight of sulfur-containing silane compound $(m^2/g)$ Note that, when the specific surface area of the inorganic material is unknown, the formula is calculated by finding out the amount for obtaining the optimal result from treating with 1 mass % of the sulfur-containing silane compound and appropriately increasing/decreasing the amount as needed.

Examples of the inorganic material include, E-glass (specific surface area 0.1 to 0.12 $m^2/g$), mica (specific surface area 0.2 to 0.3 $m^2/g$), quartz powder (specific surface area 1.0 to 2.0 $m^2/g$), calcium silicate (specific surface area 1.0 to 3.0 $m^2/g$), magnetic powder (specific surface area 1.0 to 3.0 $m^2/g$), calcium carbonate (specific surface area 2.0 to 5.0 $m^2/g$), clay (specific surface area 6.0 to 15.0 $m^2/g$), kaolin (specific surface area 7.0 to 30.0 $m^2/g$), talc (specific surface area 830 to 20.0 $m^2/g$), synthesized silica (specific surface area 200.0 to 300.0 $m^2/g$), etc.

5. Others

The compound represented by formula (1) and/or the compound represented by formula (2) above can be applied as power train related products, to automobile related products such as hybrid/electric vehicle products, diesel engine related products, starters, alternators, engine cooling products, and drive system products.

More specifically, for example:
(1) any parts of a tire such as tire tread, carcass, sidewall, inner liner, under tread, belt, etc.;
(2) exterior radiator grill, side molding, garnish (pillar, rear, cowl top), aero parts (air dam, spoiler), wheel cover, weather strip, cow belt grill, air outlet louver, air scoop, hood bulge, ventilation opening parts, anti-contact parts (over fender, side seal panel, molding (window, hood, door belt)), marks; interior window frame parts such as door, light, wiper weather strips, glass run, glass run channel, etc.;
(3) air duct hose, radiator hose, brake hose;
(4) lubricating oil system parts such as crankshaft seal, valve stem seal, head cover gasket, A/T oil cooler hose, mission oil seal, P/S hose, P/S oil seal, etc.;
(5) fuel system parts such as fuel hose, emission control hose, inlet filler hose, diaphragms, etc. and anti-vibration parts such as engine mount, in-tank pump mount, etc.;
(6) boots such as CVJ boots, rack & pinion boots, etc.;
(7) air-conditioning parts such as A/C hose, A/C seal, etc.;
(8) belt parts such as timing belt, auxiliary belt, etc.;
(9) sealers such as wind shield sealer, vinyl plastizol sealer, anaerobe sealer, body sealer, spot weld sealer, etc.

Further, the compound can be applied to air conditioning-related products such as air conditionings for passenger automobiles, air conditioning for buses, refrigerators and the like. Further, it can be applied to body-related products such as combination meters, head-up displays, body products, relays and the like. It can also be applied to running safety products such as inter-vehicular distance cruise control/pre-crash safety/lane keeping assist system, steering system, lamp control system, air bag related sensor & ECU, brake control and the like. It can also be applied to information and communication products such as car navigation system, ETC, data communication module, CAN-Gateway ECU and the like. Further, it can be applied to automobile parts, hose, belt, sheet, anti-vibration rubber, roller, lining, rubber lining cloth, sealant, gloves, fender material, medical rubber (syringe gasket, tube, catheter), gasket (for home electronics and architecture), asphalt modifier, hot-melt adhesive, boots, grips, toys, shoes, sandals, keypads, gears elastomers such as pet bottle cap liner, rubber shoes, belt, hose, anti-vibration rubber, rubber roll, printing blanket, rubber/resin lining, rubber plate (rubber sheet), conductive rubber product, sealant, sheet water-resistant, urethane coat-film water-resistant, water-shielding sheet for civil engineering, sealing device, extruded rubber product, sponge rubber product, fender material, gasket for architecture, seismic isolation rubber, pavement rubber block, non-metallic chain, medical/sanitary rubber product, rubber lining cloth product, rubber/vinyl gloves, and the like. It can also be applied to coating agents such as anti-fingerprint coating for a touch panel, lubricating coating for metal surface, primer for metal coating and the like.

By applying the compound represented by formula (1) and/or the compound represented by formula (2) above to a coating or a coating agent, it is possible to improve adhesion, weather resistance, durability, abrasion resistance and chemical resistance, as well as filler and pigment dispersibility.

In addition, by applying the compound represented by formula (1) and/or the compound represented by formula (2) above to a glass fiber reinforced resin, it is possible to improve impact strength, water resistance, electrical insulation, and long-term stability in a wet environment. In addition, it is possible to improve strength retention capability and elastic force of a heat insulating mat. Further, it is possible to prevent frays in glass fiber bundles.

By applying the compound represented by the above formula (1) and/or the compound represented by formula (2)

to a printing ink, it is possible to improve adhesiveness and releasing property as well as wettability.

By applying the compound represented by formula (1) and/or the compound represented by formula (2) above to a thermoplastic resin, dispersibility of a filler and a pigment can be improved, as well as crosslinking properties of an olefin resin and the like. In addition, one can also expect high functionality and flame retardancy are provided.

When the compound represented by formula (1) and/or the compound represented by formula (2) above is added to an organic material or an organic solvent, the addition amount can be generally 0.2 to 2.0 mass %.

When the compound represented by formula (1) and/or the compound represented by formula (2) above is used as a primer, it is preferable to first prepare a 1 to 2% solution of an alcohol-based solvent, for example, isopropyl alcohol (IPA), and apply the solution to an adherend. After that, it is preferable to volatilize the IPA and apply the desired adhesive or coating material.

EXAMPLES

The present invention will be described in more details with reference to the Examples; however, the present invention shall not be limited to these examples.

1. Preparation Example 1: Synthesis of Silyl Group-Containing VNB (VNB-SSi)

A 100 mL 2-neck flask was equipped with a ball stopper and a three way cock connected to a vacuum line. A stirrer bar was placed in the 2-neck flask, and degassing-nitrogen substitution in the system was repeated 10 times while heating with a dryer using a vacuum line to obtain an atmospheric nitrogen atmosphere. After 38.65 g (0.317 mol) of 5-vinyl-2-norbornene (VNB) was placed in the 2-neck flask, 71.93 g of toluene solvent was injected using a syringe. Thereafter, 5-vinyl-2-norbornene (VNB) was dissolved by stirring using a stirrer. Next, 68.6 g (0.288 mol) of 3-mercaptopropyltriethoxysilane was injected using a syringe. Finally, 0.4725 g (2.88 mmol) of azobisisobutyronitrile was added while nitrogen was being blown, followed by nitrogen bubbling for 20 minutes. A 2-neck flask was immersed in an oil bath, and the temperature of the oil bath was gradually increased to 70° C. to allow chemical reaction to proceed. After 6 hours of chemical reaction, the 2-neck flask was removed from the oil bath and allowed to stand at room temperature. After toluene and unreacted 5-vinyl-2-norbornene (VNB) were distilled off under reduced pressure, a silyl group-containing VNB (VNB-SSi) of 98.64 g (95% yield) was obtained. $^{1}$H-NMR and $^{13}$C-NMR measurements confirmed that the silane introduction rate was 100% and the double bond of the norbornene ring had disappeared.

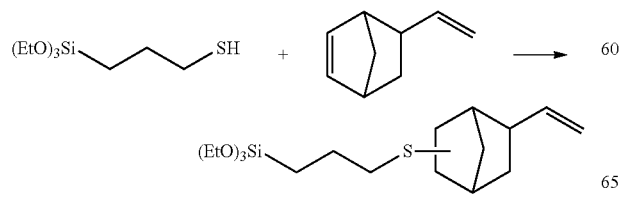

2. Example 1: Synthesis of Sulfur-Containing Silane Compound 1, Preparation and Evaluation of Rubber Compositions and Rubber Sheets Comprising Sulfur-Containing Silane Compound 1 and Natural Rubber (1) Synthesis of Sulfur-Containing Silane Compound 1

To a 50 mL 2-neck flask were added 12.55 g (0.035 mol) of the silyl group-containing VNB (VNB-SSi) obtained in Preparation Example 1, 3.37 g (0.105 mol) of sulfur, and a stirrer bar, and a three way-cock connecting a ball plug and a reflux tube was installed. Thereafter, nitrogen was blown into the system for 10 minutes to replace air in the reactor with nitrogen. Thereafter, a 2-neck flask was immersed in an oil bath, and the temperature of the oil bath was gradually increased to 160° C. to allow the chemical reaction to proceed. After the chemical reaction was carried out for 8 hours, the 2-neck flask was removed from the oil bath and allowed to stand at room temperature. 15.50 g (97%) of Sulfur-containing silane compound 1 (dark brown liquid) was obtained. FIG. 1 shows the $^{1}$H-NMR measurement result of the obtained compound. It was confirmed from FIG. 1 that the peak derived from the double bond of the vinyl group of the obtained compound disappeared.

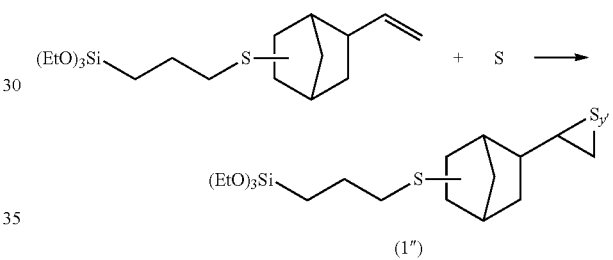

In the formula, y' is an integer from 1 to 5; and

in the formula, A represents the following formula:

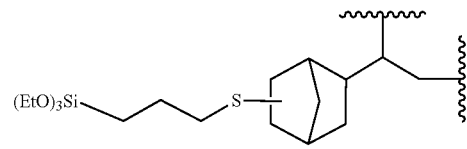

wherein, the wavy line represents a binding site to the main chain in the sulfur-containing silane compound represented by formula (2"), and E is a substituent represented by the following formula:

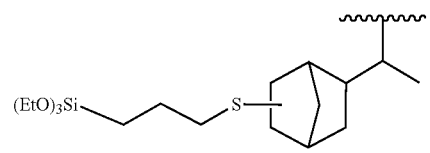

wherein the wavy line represents a binding site with $S_x$, or by the following formula:

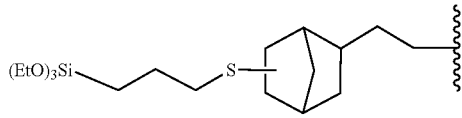

wherein, the wavy line represents a binding site with $S_x$,
x is each independently an integer of 1 to 30;
p is an integer of 0 to 30; and
m is an integer of 2 to 30.

(2) Example 1-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 15 minutes to obtain a rubber sheet having a thickness of 1 mm made of the rubber composition.

| | |
|---|---|
| Natural rubber (RSS #3) | 100 parts by mass |
| Sulfur-containing silane compound 1 (synthesized in Preparation Example 2) | 3.2 parts by mass |
| Silica AQ (product name : Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name : Stearic acid 300; manufactured by New Japan Chemical Co., Ltd.) | 1 part by mass |
| Anti-aging agent (manufactured by Ouchi Shinko Chemical Industrial Co., Ltd., NOCRAC 224) | 1 part by mass |
| Sulfur (oil-treated sulfur, manufactured by Hosoi Chemical Industry Co., Ltd.) | 2 parts by mass |
| Vulcanization accelerator (product name : NOCCELER. CZ, manufactured by Ouchi Shinko Chemical Industrial Co., Ltd.) | 1 part by mass |
| Vulcanization accelerator (product name : NOCCELER D, manufactured by Ouchi Shinko Chemical Industrial Co., Ltd.) | 0.5 part by mass |

(3) Example 1-2

A rubber composition and a rubber sheet were obtained in the same manner as in Example 1-1, except that 1.6 parts by mass of Sulfur-containing silane compound 1 and 1.6 parts by mass of another sulfur-containing silane compound (product name: Si69, manufactured by Evonik Corporation) were used instead of 3.2 parts by mass of Sulfur-containing silane compound 1.

(4) Comparative Example 1-1

A rubber composition and a rubber sheet were obtained in the same manner as in Example 1-1, except that 3.2 parts by mass of another sulfur-containing silane compound (Si69) was used instead of 3.2 parts by mass of Sulfur-containing silane compound 1.

(5) Comparative Example 1-2

A rubber composition and a rubber sheet were obtained in the same manner as in Example 1-1, except that 3.2 parts by weight of 5-(triethoxysilylmethyl)-2-norbonene trisulfide (compound represented by formula (45):

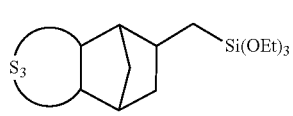

(45)

synthesized by the method described in Synthesis Example 2 in paragraph 0035 of Japanese Patent Application Laid-Open No. 2001-261685) instead of 3.2 parts by weight of Sulfur-containing silane compound 1.

(6) Physical Property Evaluation

Physical properties of the rubber sheets obtained in Examples 1-1 to 1-2 and Comparative Examples 1-1 to 1-2 were evaluated by the following method.
(JIS-A Hardness)
Six rubber sheets obtained in Examples 1-1 to 1-2 or Comparative Examples 1-1 to 1-2 were stacked and JIS-A Hardness was measured in accordance with JIS K6353 (published in 2012).
(Viscoelasticity)
Using a viscoelasticity measuring device (REOGEL E-4000 manufactured by UBM Co., Ltd.), tan δ at measurement temperatures of 0° C. and 60° C. of the rubber sheet obtained in Examples 1-1 to 1-2 or Comparative Examples 1-1 to 1-2 was determined in accordance with JIS K 6394, under conditions of a distortion: 20 μm, about 0.1%, frequencies: 10 Hz, and a tan δ balance (=tan δ (0° C.)/tan δ (60° C.)) was calculated from this value.

The measurement results of the above-mentioned physical property evaluation items (however, the tan δ balance in viscoelasticity is a calculation result from tan δ (0° C.) and tan δ (60° C.)) for Example 1-1 to 1-2 and Comparative Examples 1-1 to 1-2 are shown in Table 1. The values of tan δ (0° C.), tan δ (60° C.), and tan δ balance in Examples 1-1 to 1-2 and Comparative Example 1-2 are described as relative values when the value in Comparative Example 1-1 is 100.

TABLE 1

| | | Ex. 1-1 | Ex. 1-2 | Comp. Ex 1-1 | Comp. Ex 1-2 |
|---|---|---|---|---|---|
| Composition of Rubber Composition (parts by mass) | Natural Rubber (RSS#3) | 100 | 100 | 100 | 100 |
| | Silica AQ | 40 | 40 | 40 | 40 |
| | Zinc oxide No. 3 | 3 | 3 | 3 | 3 |
| | Stearic acid | 1 | 1 | 1 | 1 |
| | Anti-ageing agent (NOCRAC 224) | 1 | 1 | 1 | 1 |
| | Other sulfur-containing silane compound (Si69) | | 1.6 | 3.2 | |
| | Sulfur-containing silane Compound 1 | 3.2 | 1.6 | | |
| | 5-(triethoxysilyl methyl)-2-norbonene trisulfide | | | | 3.2 |
| | Subtotal | 148.2 | 148.2 | 148.2 | 148.2 |
| | Sulfur | 2 | 2 | 2 | 2 |

TABLE 1-continued

|  |  | Ex. 1-1 | Ex. 1-2 | Comp. Ex 1-1 | Comp. Ex 1-2 |
|---|---|---|---|---|---|
|  | Vulcanization accelerator (NOCCELER CZ) | 1 | 1 | 1 | 1 |
|  | Vulcanization accelerator (NOCCELER D) | 0.5 | 0.5 | 0.5 | 0.5 |
| Hardness | JIS-A Hardness | 61 | 59 | 60 | 58 |
| Viscoelasticity | tan δ (0° C.) (index) | 100.3 | 99.7 | 100.0 | 101.1 |
|  | tan δ (60° C.) (index) | 93.9 | 94.5 | 100.0 | 99.2 |
|  | tan δ balance | 106.8 | 105.5 | 100.0 | 101.9 |

When comparing the rubber sheets obtained in Examples 1-1 to 1-2 and the rubber sheet obtained in Comparative Example 1-1, it can be seen that tan δ (60° C.) is lower than that of the comparative example and rolling resistance suppression performance is excellent. Further, it can be seen that tan δ balance is higher in the rubber sheets obtained in Examples 1-1 to 1-2 and viscoelasticity is excellent.

3. Example 2: Preparation and Evaluation of a Rubber Composition and Rubber Sheet Comprising Sulfur-Containing Silane Compound 1 and Styrene-Butadiene Rubber (1) Example 2-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 1 mm made of the rubber composition.

| | |
|---|---|
| Styrene-butadiene rubber (Nipol1502, manufactured by Nippon Zeon Co., Ltd.) | 100 parts by mass |
| Sulfur-containing silane compound 1 (synthesized in Preparation Example 2) | 3.2 parts by mass |
| Silica AQ (product name : Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 224) | 1 part by mass |
| Sulfur (oil-treated sulfur, manufactured by Hosoi Chemical Industry Co., Ltd.) | 2 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER. D, manufactured by Ouchi Shinko Chemical Industrial Co., Ltd.) | 0.5 part by mass |

(2) Example 2-2

A rubber composition and a rubber sheet were obtained in the same manner as in Example 2-1, except that 1.6 parts by mass of Sulfur-containing silane compound 1 and 1.6 parts by mass of another sulfur-containing silane compound (product name: Si69, manufactured by Evonik Corporation) were used instead of 3.2 parts by mass of Sulfur-containing silane compound 1.

(4) Comparative Example 2-1

A rubber composition and a rubber sheet were obtained in the same manner as in Example 2-1, except that 3.2 parts by mass of another sulfur-containing silane compound (Si69) was used instead of Sulfur-containing silane compound 1.

(5) Comparative Example 2-2

A rubber composition and a rubber sheet were obtained in the same manner as in Example 2-1, except that 3.2 parts by weight of 5-(triethoxysilylmethyl)-2-norbonenetrisulfide (Japanese Patent Application Laid-Open No. 2001-261685) were used instead of 3.2 parts by weight of Sulfur-containing silane compound 1.

(6) Physical Property Evaluation

The physical properties (hardness and viscoelasticity) of the rubber sheets obtained in Examples 2-1 to 2-2 and Comparative Examples 2-1 to 2-2 were measured by the method described in Example 1 (6).

The measurement results of the above-mentioned physical property evaluation items (however, tan δ balance in viscoelasticity is a calculation result from tan δ (0° C.) and tan δ (60° C.)) for Examples 2-1 to 2-2 and Comparative Examples 2-1 to 2-2 are shown in Table 2. The values of tan δ (0° C.), tan δ (60° C.), and tan δ balance in Examples 2-1 to 2-2 and Comparative Example 2-2 are described as relative values when the value in Comparative Example 2-1 is 100.

TABLE 2

|  |  | Ex. 2-1 | Ex. 2-2 | Comp. Ex 2-1 | Comp. Ex 2-2 |
|---|---|---|---|---|---|
| Composition of Rubber Composition | Styrene-butadiene Rubber (Nipol 1502, manufactured by Nippon Zeon Co., Ltd.) | 100 | 100 | 100 | 100 |
|  | Silica AQ | 40 | 40 | 40 | 40 |
|  | Zinc oxide No. 3 | 3 | 3 | 3 | 3 |
|  | Stearic acid | 1 | 1 | 1 | 1 |
|  | Anti-ageing agent (NOCRAC 224) | 1 | 1 | 1 | 1 |

TABLE 2-continued

|  |  | Ex. 2-1 | Ex. 2-2 | Comp. Ex 2-1 | Comp. Ex 2-2 |
|---|---|---|---|---|---|
|  | Other sulfur-containing silane compound (Si69) |  | 1.6 | 3.2 |  |
|  | Sulfur-containing silane Compound 1 | 3.2 | 1.6 |  |  |
|  | 5-(triethoxysilyl methyl)-2-norbonene trisulfide |  |  |  | 3.2 |
|  | Subtotal | 148.2 | 148.2 | 148.2 | 148.2 |
|  | Sulfur | 2 | 2 | 2 | 2 |
|  | Vulcanization accelerator (NOCCELER CZ) | 1 | 1 | 1 | 1 |
|  | Vulcanization accelerator (NOCCELER D) | 0.5 | 0.5 | 0.5 | 0.5 |
| Hardness | JIS-A Hardness | 59 | 59 | 58 | 60 |
| Viscoelasticity | tan δ (0° C.) (index) | 102.9 | 103.1 | 100.0 | 98.3 |
|  | tan δ (60° C.) (index) | 95.5 | 97.3 | 100.0 | 98.3 |
|  | tan δ balance | 107.7 | 106.0 | 100.0 | 101.4 |

Comparing the rubber sheets obtained in Examples 2-1 to 2-2 and the rubber sheet obtained in Comparative Example 2-1, it can be seen that the tan δ (0° C.) is higher than that of the comparative example, and wet grip performance is excellent. Also, tan δ (60° C.) is lower than that of Comparative Example 2-1, and thus it can be seen that rolling resistance suppression performance is excellent. Tan δ balance is higher for the rubber sheets obtained in Examples 2-1 to 2-2, and viscoelasticity is excellent.

4. Example 3: Preparation and Evaluation of Rubber Composition and Rubber Sheet Comprising Sulfur-Containing Silane Compound 1 and Styrene-Butadiene Rubber and Butadiene Rubber (1) Example 3-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 1 mm made of the rubber composition.

| | |
|---|---|
| Styrene-butadiene rubber (Nipol1502, manufactured by Nippon Zeon Co., Ltd.) | 70 parts by mass |
| Butadiene rubber (UBEPOL BR150L manufactured by Ube Industries, Ltd.) | 30 parts by mass |
| Sulfur-containing silane compound 1 (synthesized in Preparation Example 2) | 3.2 parts by mass |
| Silica AQ (product name : Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 224) | 1 part by mass |
| Sulfur (oil-treated sulfur, manufactured by Hosoi Chemical Industry Co., Ltd.) | 2 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER D, manufactured by Ouchi Shinko Chemical Industrial Co., Ltd.) | 0.5 part by mass |

(2) Example 3-2

A rubber composition and a rubber sheet were obtained in the same manner as in Example 3-1, except that 1.6 parts by mass of Sulfur-containing silane compound 1 and 1.6 parts by mass of another sulfur-containing silane compound (product name: Si69, manufactured by Evonik Corporation) were used instead of 3.2 parts by mass of Sulfur-containing silane compound 1.

(4) Comparative Example 3-1

A rubber composition and a rubber sheet were obtained in the same manner as in Example 3-1, except that 3.2 parts by mass of another sulfur-containing silane compound (Si69) was used instead of Sulfur-containing silane compound 1.

(5) Comparative Example 3-2

A rubber composition and a rubber sheet were obtained in the same manner as in Example 3-1, except that 3.2 parts by weight of 5-(triethoxysilylmethyl)-2-norbonene trisulfide (Japanese Patent Application Laid-Open No. 2001-261685) were used instead of 3.2 parts by weight of Sulfur-containing silane compound 1.

(6) Physical Property Evaluation

The physical properties (hardness and viscoelasticity) of the rubber sheets obtained in Examples 3-1 to 3-2 and Comparative Examples 3-1 to 3-2 were measured by the method described in Example 1 (6).

The measurement results of the above-mentioned physical property evaluation items (however, tan δ balance in viscoelasticity is a calculation result from tan 4 (0° C.) and tan δ (60° C.)) for Examples 3-1 to 3-2 and Comparative Examples 3-1 to 3-2 are shown in Table 3. The values of tan δ (0° C.), tan δ (60° C.), and tan δ balance in Examples 3-1 to 3-2 and Comparative Example 3-2 are described as relative values when the value in Comparative Example 3-1 is 100.

TABLE 3

|  |  | Ex. 3-1 | Ex. 3-2 | Comp. Ex 3-1 | Comp. Ex 3-2 |
|---|---|---|---|---|---|
| Composition of Rubber Composition (parts by mass) | Styrene-butadiene rubber (Nipol 1502, manufactured by Nippon Zeon Co., Ltd.) | 70 | 70 | 70 | 70 |
|  | Butadiene rubber (UBEPOL BR150L manufactured by Ube Industries, Ltd.) | 30 | 30 | 30 | 30 |
|  | Silica AQ | 40 | 40 | 40 | 40 |
|  | Zinc oxide No. 3 | 3 | 3 | 3 | 3 |
|  | Stearic acid | 1 | 1 | 1 | 1 |
|  | Anti-ageing agent (NOCRAC 224) | 1 | 1 | 1 | 1 |
|  | Other sulfur-containing silane compound (Si69) |  | 1.6 | 3.2 |  |
|  | Sulfur-containing silane Compound 1 | 3.2 | 1.6 |  |  |
|  | 5-(triethoxysilyl methyl)-2-norbonene trisulfide |  |  |  | 3.2 |
|  | Subtotal | 148.2 | 148.2 | 148.2 | 148.2 |
|  | Sulfur | 2 | 2 | 2 | 2 |
|  | Vulcanization accelerator (NOCCELER CZ) | 1 | 1 | 1 | 1 |
|  | Vulcanization accelerator (NOCCELER D) | 0.5 | 0.5 | 0.5 | 0.5 |
| Hardness | JIS-A Hardness | 52 | 50 | 52 | 54 |
| Viscoelasticity | tan δ (0° C.) (index) | 102.2 | 100.2 | 100.0 | 99.8 |
|  | tan δ (60° C.) (index) | 93.4 | 95.5 | 100.0 | 98.6 |
|  | tan δ balance | 109.4 | 104.9 | 100.0 | 101.2 |

When the rubber sheets obtained in Examples 3-1 to 3-2 and the rubber sheet obtained in Comparative Example 3-1 are compared, it can be seen that tan δ (0° C.) is higher than that in Comparative Example 3-1 and wet grip performance is excellent. It can be seen that the tan δ (60° C.) is lower than that in Comparative Example 3-1 and rolling resistance suppression performance is excellent. It can be seen that tan δ balance is higher in the rubber sheets obtained in Examples 3-1 to 3-2 and the viscoelasticity is excellent.

These results are considered to be due to the polysulfide having high reactivity with rubber, the silyl group having high reactivity with silica, and the structure having low polarity, which the sulfur-containing silane compound used in the examples has, promoted dispersion of silica AQ and reaction with rubber. In addition, from the comparison with 5-(triethoxysilylmethyl)-2-norbornene having a short distance between the polysulfide and the silyl group, it is considered that a moderate distance gives a low polarity and a moderate degree of freedom in the rubber molecule, and thus further promoting dispersion of silica AQ and reaction with rubber.

5. Example 4: Preparation and Evaluation of Sealant Composition Comprising Sulfur-Containing Silane Compound 1

(1) Example 4-1

Sulfur-containing silane compound 1 was mixed into a one-component urethane sealing agent (Urethane Seal S700NB, manufactured by CEMEDINE CO., LTD.) in the amount shown in Table 4, and degassing is done by a vacuum drier to obtain a composition. The obtained composition was applied onto a glass plate (Matsunami Glass Industry Co., Ltd., 76 mm×26 mm×1.0 mm micro slide glass), allowed to stand at room temperature for 1 week, and cured.

(2) Comparative Example 4-1

A one-component urethane sealing agent (Urethane Seal S700NB, manufactured by CEMEDINE CO., LTD.) was applied to a glass plate (Matsunami Glass Industry Co., Ltd., micro slide glass 76 mm×26 mm×1.0 mm), allowed to stand at room temperature for 1 week, and cured.

(3) Comparative Example 4-2

3-glycidoxypropyltriethoxysilane (KBE-403, manufactured by Shin-Etsu Chemical Co., Ltd.) was mixed with a one-component urethane sealant (Urethane Seal S700NB, manufactured by CEMEDINE CO., LTD.) in the amount shown in Table 4 below, and the mixture was degassed by a vacuum drier to obtain a composition containing a sealing agent. The obtained sealing agent was applied to a glass plate (Matsunami Glass Industry Co., Ltd., micro slide glass 76 mm×26 mm×1.0 mm), allowed to stand at room temperature for 1 week, and then cured.

(4) Physical Property Evaluation

The adhesive strength (N/m) of the compositions cured in Example 4-1 and Comparative Examples 4-1 to 4-2 was measured by a 90° peeling test (tensile rate: 300 mm/min, room temperature) in accordance with JIS K6854-1. The results are shown in Table 4.

TABLE 4

|  | Member Blended | Ex.4-1 | Comp. Ex. 4-1 | Comp. Ex. 4-2 |
|---|---|---|---|---|
| Composition (parts by mass) | Urethane Sealant (S700NB, manufactured by CEMEDINE CO., LTD.) | 97 | 100 | 97 |
|  | Sulfur-ContainingSilane Compound 1 | 3 |  |  |

TABLE 4-continued

|  | Member Blended | Ex.4-1 | Comp. Ex. 4-1 | Comp. Ex. 4-2 |
|---|---|---|---|---|
|  | 3-glycidoxypropyl triethoxysilane (KBE-403, manufactured by Shin-Etsu Chemical Co., Ltd.) |  |  | 3 |
| Adhesion Strength | Peeling Strength (N/m) | 1511 | 1187 | 1362 |

When the composition obtained in Example 4-1 is compared with the compositions obtained in Comparative Examples 4-1 and 4-2, it can be seen that the composition obtained in Example 4-1 has a higher adhesive strength than the compositions obtained in Comparative Examples 4-1 and 4-2.

The invention claimed is:

1. A sulfur-containing silane compound represented by formula (1):

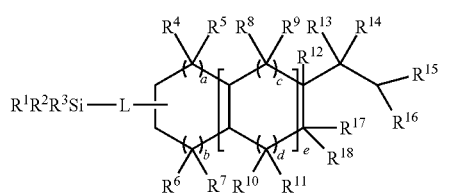

(1)

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one hetero atom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent hydrogen, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g is an integer from 1 to 5;
$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other via sulfur of 1 to 10 atoms to form a ring and $R^{14}$, $R^{15}$, and $R^{18}$ are hydrogen atoms, or $R^{14}$ and $R^{15}$ bond to each other via sulfur of 1 to 10 atoms to form a ring, and $R^{12}$, $R^{13}$, and $R^{18}$ are hydrogen atoms; or
$R^{16}$ and $R^{17}$ may bond to each other to form a 4 to 9 membered alicyclic hydrocarbon, where $R^{14}$ and $R^{15}$ bond to each other via sulfur of 1 to 10 atoms to form a ring, and $R^{12}$, $R^{13}$, and $R^{18}$ are hydrogen atoms; or by formula (2):

(2)

wherein
A is a bivalent organic group represented by formula (1-1):

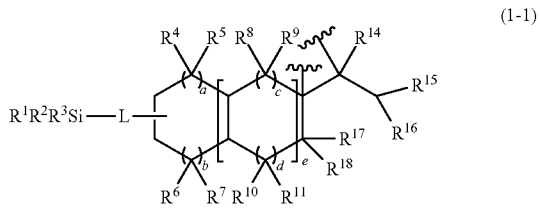

(1-1)

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one hetero atom selected from the group consisting of nitrogen, oxygen, and sulfur;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen; or one of $R^4$ or $R^5$, and $R^6$ or $R^7$ may form a cross-linked structure represented by —$(CH_2)_f$—, and f represents an integer of 1 to 5;
$R^8$, $R^9$, $R^{10}$ and $R^{11}$ represent hydrogen; or one of $R^8$ or $R^9$ and $R^{10}$ or $R^{11}$ may form a cross-linked structure represented by —$(CH_2)_g$—, and g represents an integer of 1 to 5;
$R^{14}$, $R^{15}$, and $R^{18}$ are hydrogen atoms, $R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms; and
the wavy line represents a binding site to the main chain in the sulfur-containing silane compound represented by formula (2), or formula (1-2):

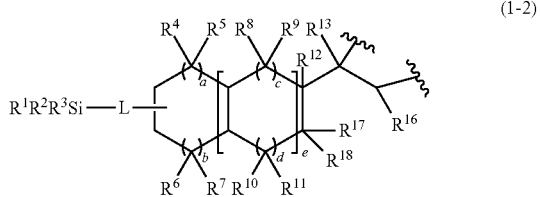

(1-2)

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one hetero atom selected from the group consisting of nitrogen, oxygen, and sulfur;
a represents an integer of 0 or 1;
b represents an integer of 0 or 1;
c independently represents an integer of 0 or 1;
d independently represents an integer of 0 or 1;
e represents an integer of 0 to 5;

$R^4$, $R^5$, $R^6$, and $R^7$ represent hydrogen; or one of $R^4$ or $R^5$, and $R^6$ or $R^7$ may form a cross-linked structure represented by $-(CH_2)_f-$, and f represents an integer of 1 to 5;

$R^8$, $R^9$, $R^{10}$ and $R^{11}$ represent hydrogen; or one of $R^8$ or $R^9$ and $R^{10}$ or $R^{11}$ may form a cross-linked structure represented by $-(CH_2)_g-$, and g represents an integer of 1 to 5;

$R^{12}$, $R^{13}$, and $R^{18}$ are hydrogen atoms;

$R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms, and $R^{16}$ and $R^{17}$ may optionally bind to each other to form an alicyclic hydrocarbon of 4 to 9 members; and the wavy line represents a binding site to the main chain in the sulfur-containing silane compound represented by formula (2);

E represents a hydrogen atom or a substituent represented by formula (1-1-1):

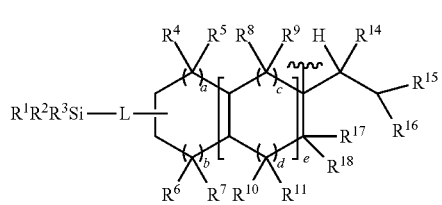
(1-1-1)

or formula (1-1-2):

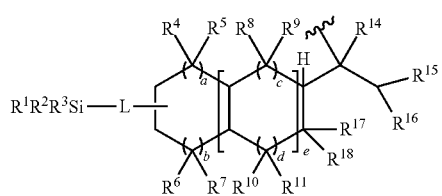
(1-1-2)

or formula (1-2-1):

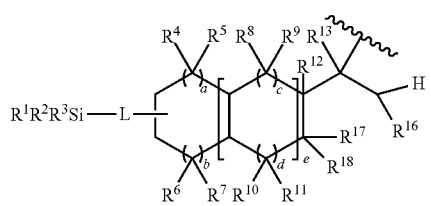
(1-2-1)

or formula (1-2-2):

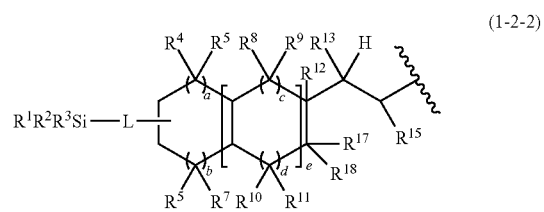
(1-2-2)

wherein
$R^1$ to $R^{18}$, L, and a to e are according to formulae (1-1) and (1-2),
the wavy lines represent binding sites with $S_x$;
x each independently represents an integer from 1 to 30;
p represents an integer from 0 to 30;
m represents an integer from 2 to 30.

2. The sulfur-containing silane compound according to claim 1, represented by formula (3):

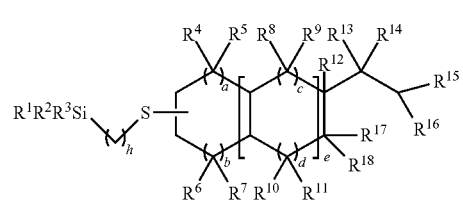
(3)

wherein
$R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent hydrogen, or one of $R^4$ or $R^5$, and $R^6$ or $R^7$ may form a cross-linked structure represented by $-(CH_2)_f-$, and f represents an integer of 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by $-(CH_2)_g-$, and g represents an integer of 1 to 5;
$R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms, where $R^{12}$ and $R^{13}$ bond to each other via sulfur of 1 to 10 atoms to form a ring, and $R^{14}$, $R^{15}$ and $R^{18}$ are hydrogen atoms, or $R^{14}$ and $R^{15}$ bond to each other via sulfur of 1 to 10 atoms to form a ring and $R^{12}$, $R^{13}$, and $R^{18}$ are hydrogen atoms; or
$R^{16}$ and $R^{17}$ may bond to each other to form a 4 to 9 membered alicyclic hydrocarbon, where $R^{14}$ and $R^{15}$ bond to each other via sulfur of 1 to 10 atoms to form a ring and $R^{12}$, $R^{13}$, and $R^{18}$ are hydrogen atoms.

3. The sulfur-containing silane compound according to claim 1, represented by formula (4):

(4)

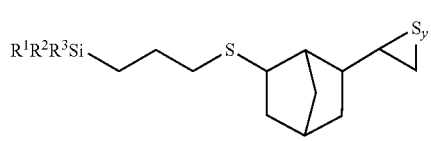

wherein
R¹, R², and R³ each independently represents a hydrocarbon group optionally containing an oxygen atom or a nitrogen atom, or a hydrogen atom; and
y is an integer of 1 to 10, or formula (5):

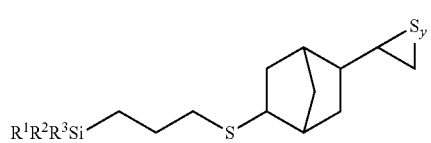

(5)

wherein
R¹, R², and R³ each independently represents a hydrocarbon group optionally containing an oxygen atom or a nitrogen atom, or a hydrogen atom; and
y is an integer of 1 to 10, or formula (18):

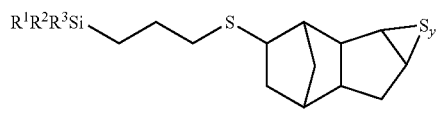

(18)

wherein
R¹, R², and R³ each independently represents a hydrocarbon group optionally containing an oxygen atom or a nitrogen atom, or a hydrogen atom; and
y is an integer of 1 to 10, or formula (19):

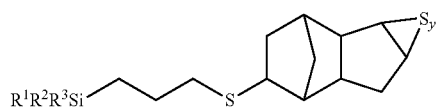

(19)

wherein
R¹, R², and R³ each independently represents a hydrocarbon group optionally containing an oxygen atom or a nitrogen atom, or a hydrogen atom; and
y is an integer of 1 to 10.

4. The sulfur-containing silane compound according to claim 1, represented by formula (2), wherein A is a bivalent organic group represented by formula (3-1):

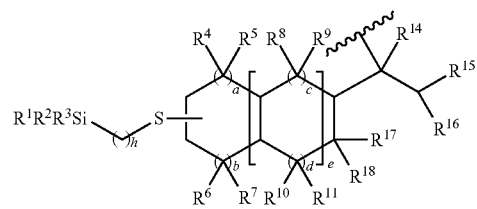

(3-1)

wherein
$R^1$, $R^2$, and $R^3$ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen, or one of $R^4$ or $R^5$, and $R^6$ or $R^7$ may form a cross-linked structure represented by —$(CH_2)_f$—, and f represents an integer of 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g represents an integer of 1 to 5;
$R^{14}$, $R^{15}$, and $R^{18}$ are hydrogen atoms, $R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms; and
the wavy line represents a binding site to the main chain in the sulfur-containing silane compound represented by formula (2), or formula (3-2):

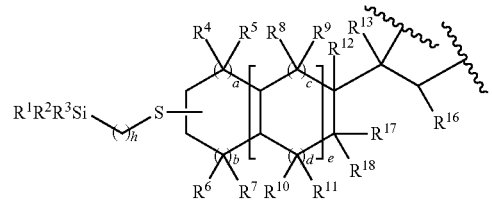

(3-2)

wherein
$R^1$, $R^2$, and $R^3$ each independently represents a hydrocarbon group optionally containing an oxygen atom or a nitrogen atom, or a hydrogen atom;
h represents an integer from 1 to 10;
a represents an integer of 0 or 1;
b represents an integer of 0 or 1;
c independently represents an integer of 0 or 1;
d independently represents an integer of 0 or 1;
e represents an integer of 0 to 5;
$R^4$, $R^5$, $R^6$, and $R^7$ represent hydrogen, or one of $R^4$ or $R^5$, and $R^6$ or $R^7$ may form a cross-linked structure represented by —$(CH_2)_f$—, and f represents an integer of 1 to 5;
$R^8$, $R^9$, $R^{10}$ and $R^{11}$ represent hydrogen, or one of $R^8$ or $R^9$ and $R^{10}$ or $R^{11}$ may form a cross-linked structure represented by —$(CH_2)_g$—, and g represents an integer of 1 to 5;

$R^{12}$, $R^{13}$, and $R^{18}$ are hydrogen atoms;

$R^{16}$ is a hydrogen atom, a methyl group, or an alkyl group having 2 to 8 carbon atoms, and $R^{17}$ is a hydrogen atom, a methyl group, or an alkyl group having 2 to 10 carbon atoms, and $R^{16}$ and $R^{17}$ may optionally bind to each other to form an alicyclic hydrocarbon of 4 to 9 members;

the wavy line represents a binding site to the main chain in the sulfur-containing silane compound represented by formula (2).

5. The sulfur-containing silane compound according to claim 1, represented by formula (2), wherein A is a bivalent organic group represented by formula (4-1):

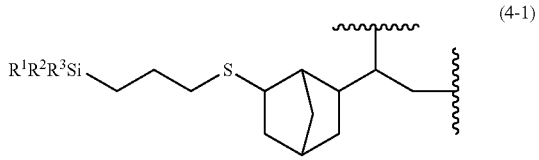

(4-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (5-1):

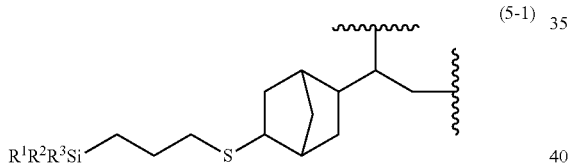

(5-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (18-1):

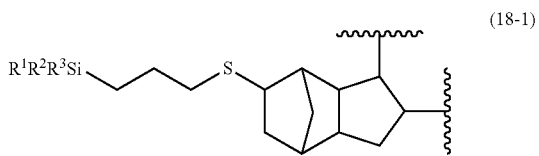

(18-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2); or formula (19-1):

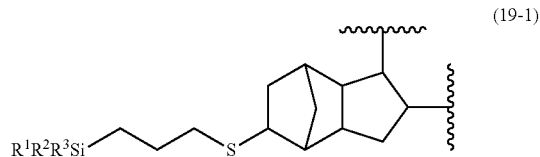

(19-1)

wherein $R^1$, $R^2$, and $R^3$ each independently represents a hydrocarbon group optionally containing an oxygen atom or a nitrogen atom, or a hydrogen atom; and the wavy line represents a binding site to the main chain in the sulfur-containing silane compound represented by formula (2).

6. The sulfur-containing silane compound according to claim 1, wherein $R^1R^2R^3Si$ group has a chemical structure of formula (6):

(6)

wherein $R^{19}$ each independently represents an alkoxy group or an amino group substituted with one or more alkyl groups;

$R^{20}$ each independently represents hydrogen or an alkyl group;

$L^1$ each independently represents a hydrocarbon group optionally including at least one hetero atom selected from the group consisting of nitrogen, oxygen, and sulfur;

j is independently an integer of 0 or 1;

k is an integer of 1 to 3; and an asterisk (*) indicates a region bonded to a moiety other than a silyl group of the sulfur-containing silane compound.

7. The sulfur-containing silane compound according to claim 1, wherein $R^1R^2R^3Si$ group is a triethoxysilyl group.

8. A composition comprising the sulfur-containing silane compound according to claim 1 and a polymer that is capable of reacting with the sulfur-containing silane compound.

9. The composition according to claim 8, wherein the polymer is an elastomer having a glass transition point of 25° C. or lower and the composition further comprises an inorganic material.

10. The composition according to claim 9, wherein the elastomer having a glass transition point of 25° C. or lower comprises at least one selected from the group consisting of natural rubber, butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, chloroprene rubber, butyl rubber, and halogenated isobutylene-p-methyl styrene rubber.

11. The composition according to claim 9, further comprising a sulfur-containing silane compound other than the compound represented by said formula (1) or (2).

12. The composition according to claim 11, wherein the sulfur-containing silane compound other than the compound represented by formula (1) or (2) above is a sulfur-containing silane compound represented by formula (7):

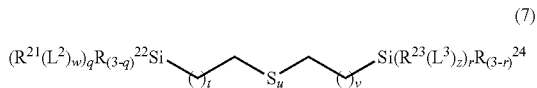
(7)

wherein t and v are each independently an integer from 0 to 10;
u is an integer from 2 to 10;
q and r are each independently an integer from 1 to 3;
w and z are each independently an integer of 0 or 1;
$L^2$ and $L^3$ are each independently a hydrocarbon group optionally containing at least one hetero atom selected from the group consisting of nitrogen, oxygen, and sulfur;
$R^{21}$ and $R^{23}$ are each independently an alkoxy group or an amino group substituted with one or more alkyl groups; and
$R^{22}$ and $R^{24}$ are each independently hydrogen or an alkyl group.

13. The composition according to claim 9, wherein a total content of the sulfur-containing silane compound in the composition is 0.1 to 30 parts by mass with respect to 100 parts by mass of the elastomer.

14. The composition according to claim 11, wherein a proportion of the content of the sulfur-containing silane compound other than the compound represented by formula (1) or (2) in the composition with respect to a total content of the sulfur-containing silane compound in the composition is 0.1 to 0.9 on a mass basis.

15. A method for producing the composition according to claim 9, comprising a step of kneading the sulfur-containing silane compound, the elastomer, and the inorganic material.

16. The method according to claim 15, further comprising the step of kneading a vulcanizing agent.

17. A cross-linked product of the composition according to claim 9.

18. A tire comprising the cross-linked product according to claim 17.

19. The composition according to claim 8, wherein the polymer is a sealing polymer or an adhesive.

20. The composition according to claim 19, wherein a content of the sulfur-containing silane compound in the composition is 0.1 to 30 parts by mass with respect to 100 parts by mass of the composition.

* * * * *